US011469060B1

(12) United States Patent
Hsu et al.

(10) Patent No.: US 11,469,060 B1
(45) Date of Patent: Oct. 11, 2022

(54) LIGHT GUIDE FOR A KEYBOARD

(71) Applicant: Logitech Europe S.A., Lausanne (CH)

(72) Inventors: Fu-Kai Hsu, New Taipei (TW);
Yung-Lin Chen, Hsinchu (TW);
Feng-Hao Lin, Hsinchu (TW)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 17/246,373

(22) Filed: Apr. 30, 2021

(51) Int. Cl.
*H01H 13/00* (2006.01)
*H01H 13/83* (2006.01)
*F21V 8/00* (2006.01)

(52) U.S. Cl.
CPC .......... *H01H 13/83* (2013.01); *G02B 6/0046* (2013.01); *H01H 2219/037* (2013.01); *H01H 2219/062* (2013.01)

(58) Field of Classification Search
CPC ............. H01H 2219/062; H01H 13/83; G02B 6/0046; G06F 3/02
See application file for complete search history.

(56) References Cited

U.S. PATENT DOCUMENTS

| 5,034,602 | A | * | 7/1991 | Garcia, Jr. | ........... H03K 17/968 250/227.22 |
| 5,408,060 | A | * | 4/1995 | Muurinen | ................ G05G 1/02 200/310 |
| 8,217,285 | B2 | * | 7/2012 | Chang | ................ H01H 13/7006 200/313 |
| 10,347,443 | B1 | * | 7/2019 | Wu | ...................... G02B 6/0023 |
| 10,444,856 | B1 | * | 10/2019 | Wang | ...................... G06F 3/0216 |
| 10,578,791 | B2 | * | 3/2020 | Miyanaga | ............ G02B 6/0046 |
| 10,871,602 | B1 | * | 12/2020 | Ho | .......................... G02B 6/002 |
| 10,886,082 | B1 | * | 1/2021 | Wang | ................... H01H 13/023 |
| 11,099,315 | B1 | * | 8/2021 | Wang | ................... G02B 6/0031 |
| 2008/0170381 | A1 | * | 7/2008 | Chou | ..................... H01H 13/83 362/23.03 |
| 2009/0067151 | A1 | * | 3/2009 | Sahlin | .................. G02B 6/0035 362/23.03 |

(Continued)

FOREIGN PATENT DOCUMENTS

CN     204539108 U     8/2015
CN     205194593 U     4/2016

(Continued)

OTHER PUBLICATIONS

CN202120938310.3, "Utility Model Patentability Evaluation Report", Jul. 5, 2022, 6 pages.

*Primary Examiner* — Gerald J Sufleta, II
(74) *Attorney, Agent, or Firm* — Kilpatrick Townsend & Stockton LLP

(57) ABSTRACT

Aspects of the invention relate to a keyboard key structure, a light guide for the keyboard key structure, and a computer key mechanism. The keyboard key structure can include a substrate; a key switch where the bottom of the key switch is configured to be coupled to the substrate; a keycap including a transparent region; a light guide coupled to the side of the key switch, the light guide comprising: a planar bottom surface and a planar top surface that is wider than and parallel to the bottom surface; a light emitting element coupled to the substrate and configured under the bottom surface of the light guide such that the light emitting element, the light guide, and the transparent region of the key cap are in a collinear arrangement.

28 Claims, 25 Drawing Sheets

(56) References Cited

U.S. PATENT DOCUMENTS

| | | | |
|---|---|---|---|
| 2010/0288615 A1 | 11/2010 | Mafune et al. | |
| 2011/0025607 A1 | 2/2011 | Bowen | |
| 2014/0233237 A1* | 8/2014 | Lutian | G02B 19/0061 |
| | | | 362/257 |
| 2018/0082800 A1* | 3/2018 | Wang | H01H 13/83 |
| 2019/0206641 A1* | 7/2019 | Wang | H01H 13/88 |
| 2019/0354196 A1* | 11/2019 | Wang | G06F 3/0202 |
| 2020/0043681 A1* | 2/2020 | Chen | G02B 6/0036 |
| 2020/0124781 A1* | 4/2020 | Tseng | G02B 6/005 |
| 2021/0034165 A1* | 2/2021 | Shipman | G06F 3/0238 |
| 2021/0223460 A1* | 7/2021 | Jia | G02B 6/0046 |

FOREIGN PATENT DOCUMENTS

| | | |
|---|---|---|
| CN | 106611670 A | 5/2017 |
| CN | 107408470 A | 11/2017 |
| CN | 108091510 A | 5/2018 |

\* cited by examiner

LIGHT GUIDE FOR A KEYBOARD

TECHNICAL FIELD

Aspects of the present disclosure relates to a keyboard key structure, a light guide for the keyboard key structure, and a computer key mechanism.

BACKGROUND

Peripheral devices generally include auxiliary devices that can be used to interface a human with a computer. Some common peripheral devices include keyboards, computer mice, image scanners, speakers, microphones, web cameras, and more. Keyboards, for instance, have improved in function and performance over the last few decades to increase user productivity, ergonomics and performance. For instance, the advent of function keys, key pads, programmable hot keys, scroll wheels, and the like, have helped users become more efficient by placing commonly used functions in quickly accessible locations on the keyboard.

Key switches, in particular, have been improved and modified to adapt to particular user needs. A key switch is a mechanism of the overall key structure that registers a key stroke and can vary in response profiles, sound, and travel times, which can be selected to suit a user's needs. Some key switch profiles can have increased tactile feedback, a linear feedback profile, faster response times (e.g., shorter activation thresholds), or relatively quiet operation to name a few common key switch types.

In some cases, key structures can be illuminated to highlight an alphanumeric character or symbol on a corresponding key cap. Backlighting, for instance, can include an array of lights configured beneath the key switches of a keyboard that generally direct light upwards and through transparent portions of the key cap. Backlighting may be used in gaming applications, for example, to dynamically generate multi-colored lighting patterns across the keyboard. However, backlighting solutions typically have an area effect and generally do not provide for individual key addressing and lighting. Thus, backlighting can improve the user experience, but is limited in its useful application. Better solutions for key lighting are needed.

It should be noted that unless otherwise indicated herein, the materials described in this section are not prior art to the claims in this application and are not admitted to be prior art by inclusion in this section.

BRIEF SUMMARY

In certain embodiments, a keyboard key structure comprises a substrate, a key switch having a top, a bottom, and a side, with the bottom of the key switch configured to be coupled to the substrate, a keycap including a transparent region and configured to be coupled to the top of the key switch, a light guide coupled to the side of the key switch and comprising a planar bottom surface and a planar top surface that is wider than and parallel to the bottom surface, and a light emitting element coupled to the substrate and configured under the bottom surface of the light guide such that the light emitting element, the light guide, and the transparent region of the key cap are in a collinear arrangement. The light emitting element can be operable to emit light into the bottom surface of the light guide. The light guide can direct the light entering the bottom surface through a body of the light guide, out of the top surface of the light guide, and through the transparent region of the key cap. A distance (K) of an air gap between the light emitting element and the light guide can be 0<K<0.3 mm inclusive. A width of the bottom surface of the light guide can be wider than a width of the light emitting element. The light guide has a trapezoidal shape and a uniform thickness. The top surface of the light guide may be at a distance D from the transparent region of the keycap when the key switch is in a non-depressed state, and the dimensions of the light guide may cause the light exiting the light guide at the top surface to undergo light spread at an angle that causes the light to fill the transparent region of the keycap when the transparent region is at the distance D from the light guide. The distance D may be greater than or equal to 4 mm. A thickness of the light guide can be from 1 mm to 3.5 mm inclusive. A width of the transparent region can be equal to or less than a width of the top surface of the light guide. A width of the top surface of the light guide may be at least twice a width of the bottom surface of the light guide. A height of the transparent region may be greater than or equal to 0.8 mm. The thickness of the transparent region can be less than or equal to the thickness of the light guide plus 2 mm.

In some embodiments, a light guide for a keyboard key structure comprises a planar bottom surface and a planar top surface that is two times as wide and parallel to the bottom surface. In some aspects, the light guide in operation is configured to be placed between a light emitting element and a transparent region of a key cap in a collinear arrangement, where the light guide receives light on its bottom surface from the light emitting element, and where the light guide directs the light entering the bottom surface through a body of the light guide, out of the top surface of the light guide and out toward the transparent region of the key cap.

The light guide can have a trapezoidal shape and a uniform thickness. The light guide can have a height of greater than or equal to 5 mm. The light guide may have a depth T such that 1 mm≤T≤3.5 mm. The bottom surface of the light guide can be configured to be placed at a distance (K) from the light emitting element, such that 0<K<0.3 mm inclusive. A width of the bottom surface of the light guide can be wider than a width of the light emitting element. The top surface of the light guide can be at a distance D from the transparent region of the keycap when the key switch is in a non-depressed state, and the dimensions of the light guide may cause the light exiting the light guide at the top surface to undergo light spread at an angle that causes the light to fill the transparent region of the keycap when the transparent region is at the distance D from the light guide. The distance D can be greater than or equal to 4 mm. A width of the transparent region can be less than or equal to a width of the top surface of the light guide. The thickness of the transparent region can be less than or equal to the thickness of the light guide plus 2 mm. In some embodiments, a computer key mechanism comprises: a keycap including an illuminated portion that is at least partially transparent; a light emitter; a light pipe coupled to the keycap and the light emitter, wherein the light pipe is shaped as a trapezoidal prism having a distal end located adjacent to the keycap and a proximal end located adjacent to the light emitter; and wherein the light pipe has a uniform thickness.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1:
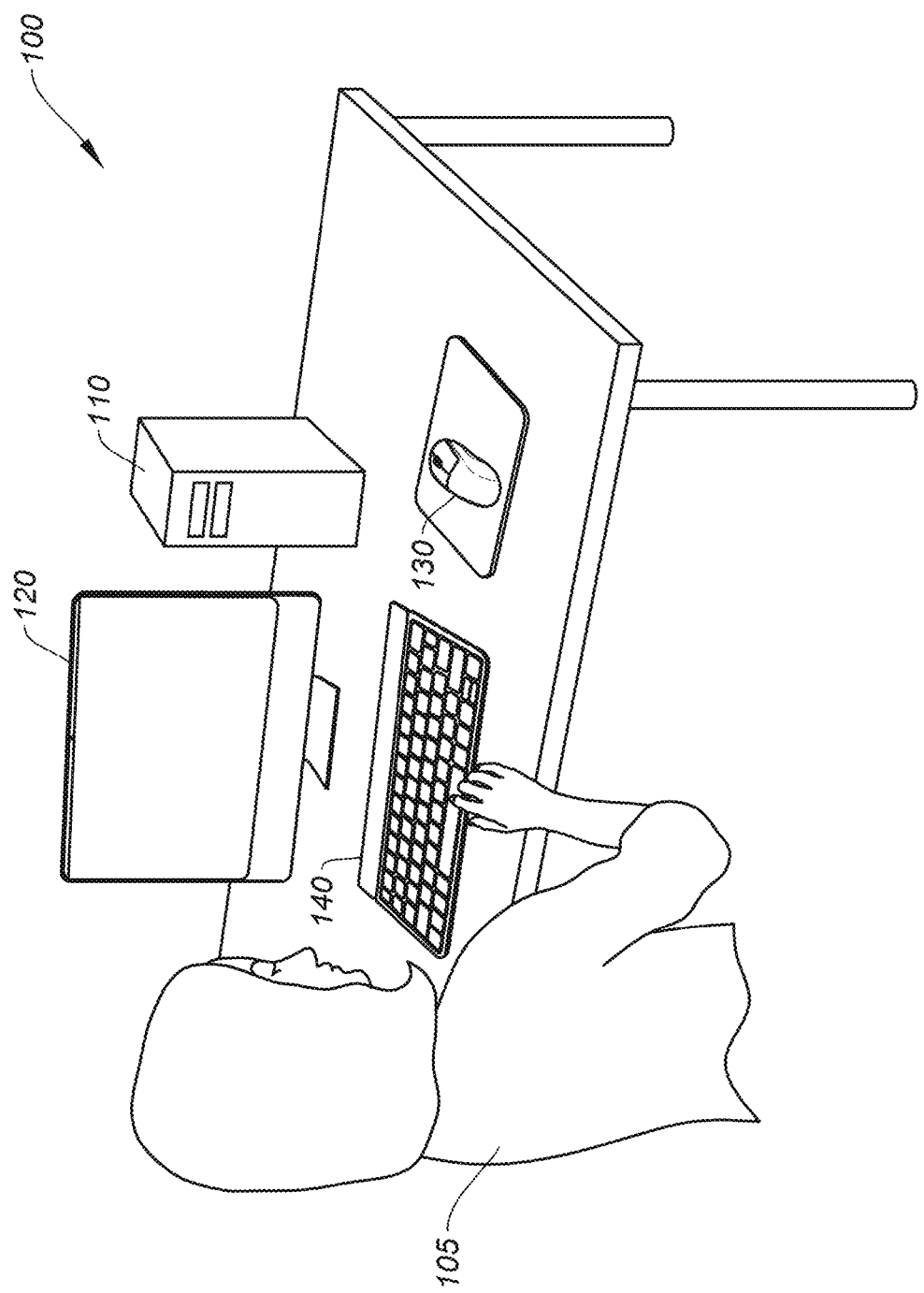
FIG. 1 shows a keyboard in typical system environment.

Aspects of the present disclosure relate generally to key structures and, more particularly, to embodiments of a light guide that may be used to direct light from a light emitting element to a key cap to individually illuminate portions of a corresponding key structure, according to certain embodiments.

In the following description, various examples of light guides are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Aspects of the invention relate to computer key structures that can include a keycap, a key switch, a light emitting element (e.g., also referred to as a "light emitter," "light," "light illuminating device," or other suitable term that indicates a light source), a light guide (also referred to as a "light pipe" or a "lens"), and other related structures, as shown for example in FIG. 4. The keycap can include a transparent region that can be illuminated by the light emitting element via the light guide. The light guide can be configured between the keycap and the light emitting element (e.g., a light emitting diode (LED)). The light guide may be operable to couple light from an underlying LED, through the light guide, and disperse the light out towards the transparent region of the key cap. The transparent region can include a transparent symbol, character, glyph, etc., indicating a function of the key (for example, the "A" key may have an illuminated "A" symbol). The keycaps are actuated by a user of the keyboard by pressing on them with a finger or thumb. Depending on the design of the keycap, the light may be dispersed more or less efficiently and in different patterns. Disclosed are techniques found to provide a desirable balance between light dispersion across the illuminated portion of the keycap and relatively high light transmittance from a light source (e.g., relatively high efficiency of transmittance).

In some exemplary embodiments, a keyboard key structure can include a substrate, a key switch having a top, a bottom, and a side, where the bottom of the key switch is configured to be coupled to the substrate. The key structure can also include a keycap including a transparent region, the key cap configured to be coupled to the top of the key switch, and a light guide coupled to the side of the key switch, the light guide including a planar bottom surface and a planar top surface that is wider than and parallel to the bottom surface. The key structure may further include a light emitting element coupled to the substrate and configured under the bottom surface of the light guide such that the light emitting element, the light guide, and the transparent region of the key cap configured in a collinear arrangement. The light emitting element can be operable to emit light into the bottom surface of the light guide, and the light guide may direct the light entering the bottom surface through a body of the light guide, out of the top surface of the light guide and through the transparent region of the key cap.

Figure 5:
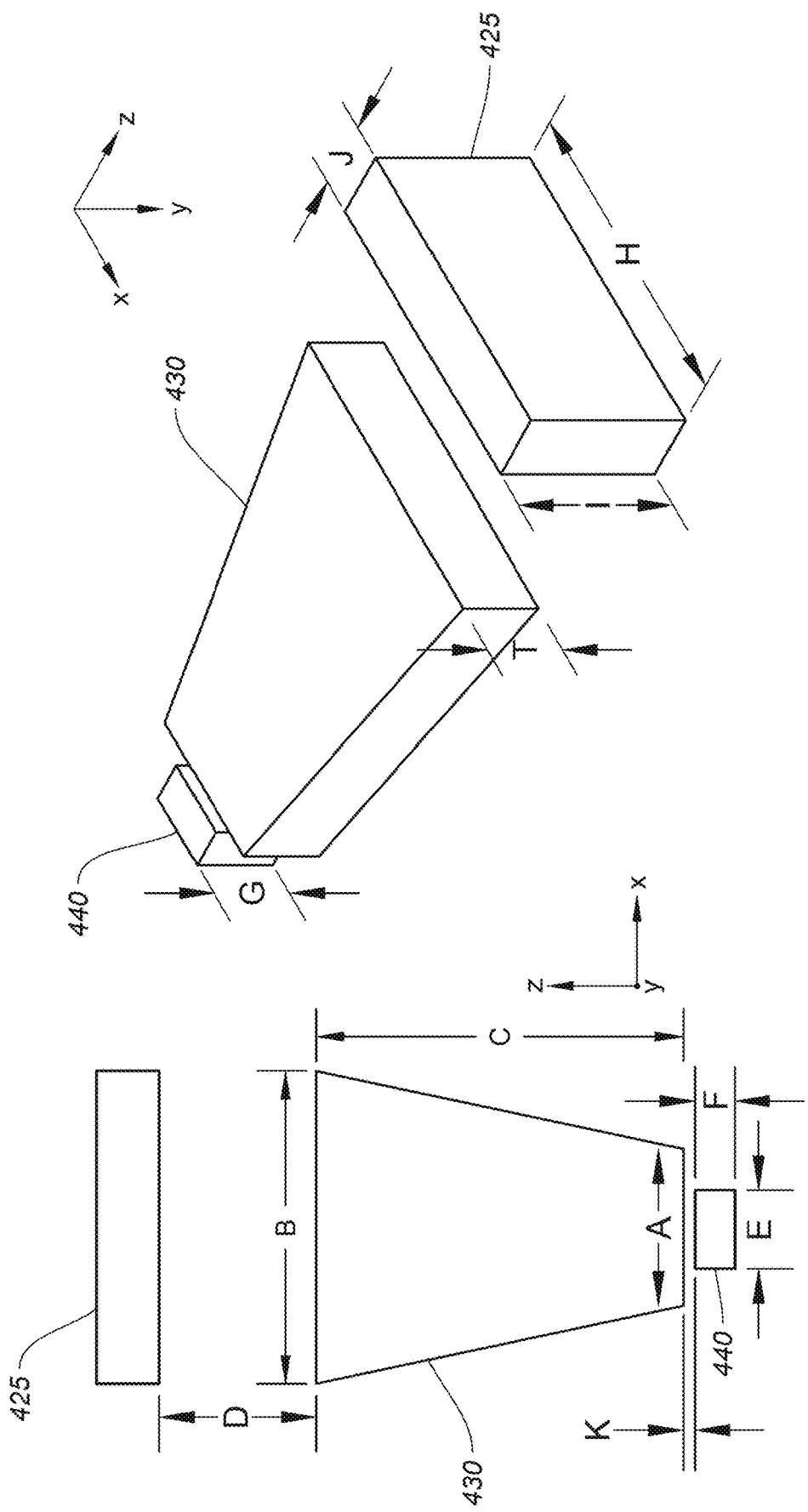
FIG. 5 shows various dimensions light guide, according to certain embodiments.

In some embodiments, the light guide can be shaped as a trapezoidal prism having a distal end located adjacent to the keycap and a proximal end located adjacent to the light emitting element, as shown for example in FIG. 5. In certain embodiments, a length of the distal end can be substantially twice a corresponding length of the proximal end. The light guide can have a uniform thickness. A distance between the distal end and the proximal end can be greater than or equal to five millimeters. A distance between the distal end of the light guide and the keycap can be greater than or equal to four millimeters. The trapezoidal prism can be an isosceles trapezoidal prism. The light guide can have a thickness of greater than or equal to one millimeter and less than or equal to three and a half millimeters. The light guide can have a refractive index of between one and three tenths and one and seven tenths. The illuminated portion (e.g., transparent region) can have a length corresponding to the length of the distal end of the light guide wherein the length of the illuminated portion can be less than or equal to the length of the distal end. The illuminated portion can have a thickness corresponding to the thickness of the light guide. The thickness of the illuminated portion can be less than two millimeters more than the thickness of the light guide. The illuminated portion can have a height corresponding to the height of the light guide. The height of the illuminated portion can be greater than or equal to eight tenths of a millimeter. A width of an air gap between the light emitter and the light guide can be between zero and three tenths of a millimeter inclusively. In some cases, a width of the bottom surface of the light guide may be wider than a width of the light emitting element. In some aspects, the top surface of the light guide is at a distance D (e.g., greater than or equal to 4 mm) from the transparent region of the keycap when the key switch is in a non-depressed state, and the dimensions of the light guide cause the light exiting the light guide at its top surface to undergo light spread at an angle that causes the light to fill the transparent region of the keycap when the transparent region is at the distance D from the light guide. The light guide may be configured to emit increased homogeneous illumination and/or color uniformity in the transparent region. In certain embodiments, a width of the top surface of the light guide can be at least twice a width of the bottom surface of the light guide.

It is to be understood that this high level summary is presented to provide the reader with a baseline understanding of some of the novel aspects of the present disclosure and a roadmap to the details that follow. This high level summary in no way limits the scope of the various embodiments described throughout the detailed description and each of the figures referenced above are further described below in greater detail and in their proper scope.

FIG. 1 shows an example of a computer system 100 that can include any of a variety of host computing devices and computer peripheral devices, including peripheral devices (e.g., a keyboard or computer mouse) that can be configured to include aspects of the various inventive concepts described herein. Computer system 100 shows a user 105 operating a host computing device (shown as a desktop computer) 110 and a number of computer peripheral devices communicatively coupled to host computing device 110, including a display device 120, a computer mouse 130, and keyboard 140, and may include any other suitable computer peripheral device(s).

Although the host computing device is shown as a desktop computer, other types of host computing devices can be used including gaming systems, laptop computers, set top boxes, entertainment systems, tablet or "phablet" computers, stand-alone head mounted displays (HMDs), or any other suitable host computing device (e.g., smart phone, smart wearable, internet-of-things (IoT) devices, or the like). In some cases, multiple host computing devices may be used, and one or more of the computer peripheral devices may be communicatively coupled to one, some, or all of the host computing devices (e.g., a computer keyboard may be coupled to multiple host computing devices). A host computing device may also be referred to herein as a "host," "host computer," "host device," "computing device," "computer," or the like, and may include a machine readable medium (not shown) configured to store computer code, such as driver software, firmware, and the like, where the computer code may be executable by one or more processors of the host computing device(s) to control aspects of the host computing device, for instance via the one or more computer peripheral devices.

A typical computer peripheral device can include any suitable input device, output device, or input/output device including those shown (e.g., computer keyboard 140) and not shown (e.g., game controller, HMD, or remote control), AR/VR controller, joystick, stylus device, or other suitable device that can be used to convert analog inputs into digital signals for computer processing. By way of example, a computer peripheral device (e.g., keyboard 140) can be configured to provide control signals for input detection (e.g., alphanumeric input or knob/wheel movement), output functions (e.g., LED control, haptic feedback, or displays), or any of myriad other features that can be provided by a computer peripheral device, as would be appreciated by one of ordinary skill in the art with the benefit of this disclosure.

A computer peripheral device may be referred to as an "input device," "peripheral input device," "peripheral device," "computer input device," "user interface device," "control device," "input unit," or the like. The majority of the embodiments described herein generally refer to a particular computer peripheral device (keyboard 140) and corresponding features thereof (e.g., key structures, light emitting elements, light guides, or key caps), however it should be understood that a computer peripheral device can be any suitable input/output (I/O) device that may be adapted to utilize the novel embodiments described and contemplated herein.

Figure 2:
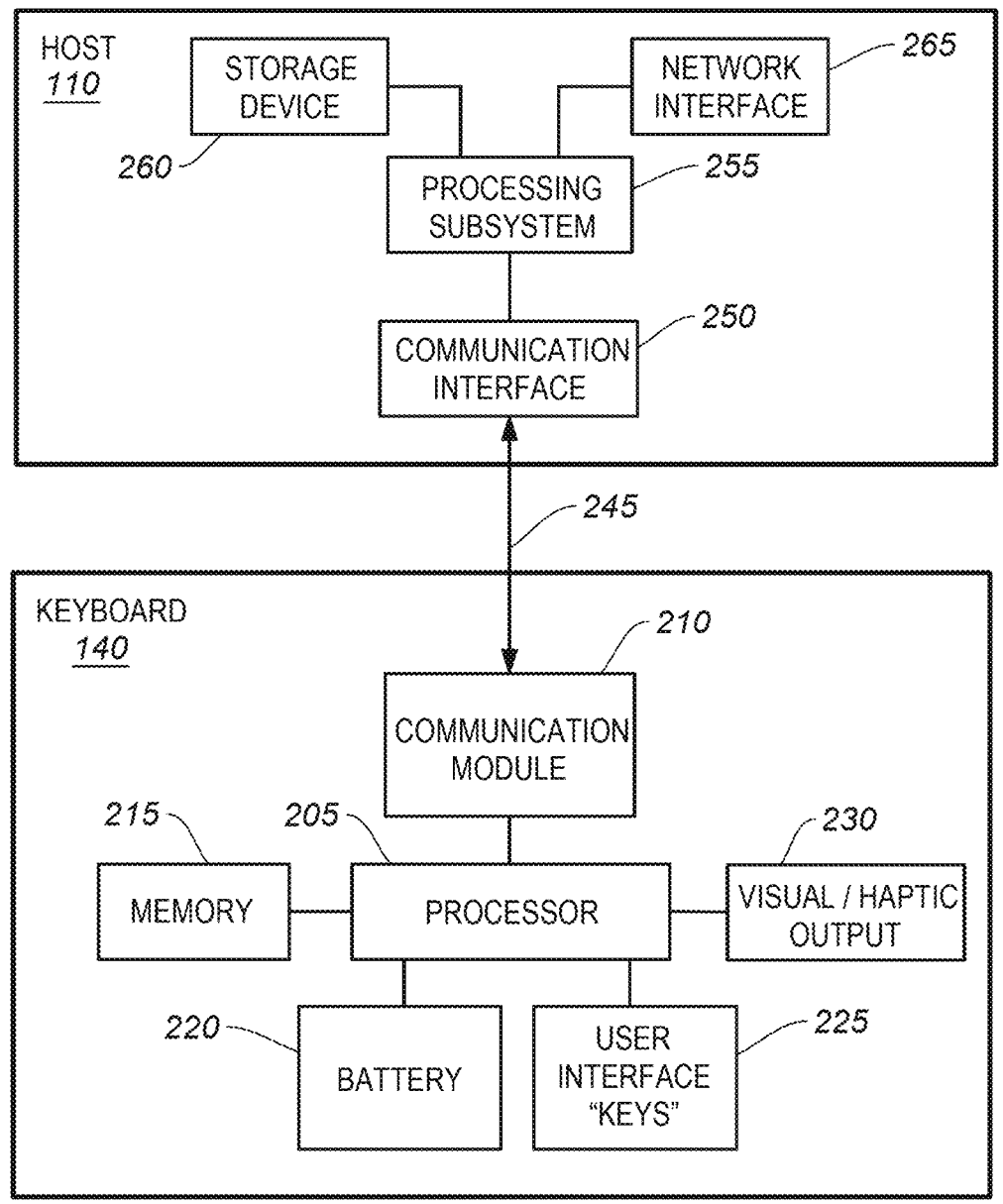
FIG. 2 shows a simplified system block diagram of a keyboard and a host computing device, according to certain embodiments.

FIG. 2 illustrates a simplified block diagram of keyboard 140 and an example host computing device 110 shown in FIG. 1. As shown in FIG. 2, keyboard 140 can include a processor 205 that is coupled to a communication module 210, a memory 215, a battery 220, one or more user interface keys 225, and visual/haptic output module 230. Plurality of user interface keys 225 can be configured to be physically actuated by a user of the keyboard with each key communicating a particular signal to processor 205. Processor 205 includes circuitry that receives a particular signal from each user interface key 225 and responds by commanding communication module 210 to transmit a signal corresponding to that particular key to host computer 110 via communication channel 245. Processor 205 can be programmed to employ one or more visual and/or haptic outputs 230 (e.g., lights, audible sounds, vibrations, etc.), as would be appreciated by one of ordinary skill in the art with the benefit of this disclosure.

In some embodiments, battery 220 can independently power some or all of the keyboard functional blocks 205-

230, including processor 205. In such embodiments, keyboard 140 can be configured independently from host computing device 110 with the configurations stored in memory 215. In further embodiments, keyboard 140 can be used with multiple host computing devices 110 and can maintain a constant configuration regardless of the host that it is communicating with. Further, in some embodiments there may be no need for a host computing device to install software to communicate with keyboard 140.

Processor 205 can include any type of logic device including a programmable integrated circuit or, e.g., one or more single-core or multi-core microprocessors and/or microcontrollers executing program code to perform various functions associated with keyboard 140. For example, processor 205 can implement various processes (or portions thereof) described throughout this disclosure as being implemented by a peripheral device, e.g., by executing program code stored in memory 215. Processor 205 can also execute other programs to control other functions of keyboard 140. In some instances, programs executed by processor 205 can interact with a host computer (e.g., host computer 110) by generating messages to be sent to the host computer and/or receiving messages from the host computer. In some instances, the messages can be sent and/or received using communication module 210 or a wired connection (e.g., universal serial bus (USB)).

Communication module 210 can provide wireless or wired communication capability for keyboard 140. In some embodiments, communication module 210 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication module 210 can provide wired network connectivity (e.g., Ethernet) in addition to or instead of a wireless interface. Communication module 210 can be implemented using a combination of hardware (e.g., driver circuits, antennas, modulators/demodulators, encoders/decoders, and other analog and/or digital signal processing circuits) and software components. In some embodiments, communication module 210 can support multiple communication channels concurrently or at different times, using the same transport or different transports. Thus, for example, keyboard 140 can communicate with a host via a local channel at some times and via a relay service at other times.

Memory 215 can be implemented, e.g., using disk, flash memory, or any other non-transitory storage medium, or a combination of media, and can include volatile and/or non-volatile media. In some embodiments, memory 215 can store one or more programs (e.g., firmware) to be executed by processor 205, including programs to implement various operations described as being performed by a keyboard or other suitable computer peripheral devices. Memory 215 can also store a peripheral device object or peripheral device definition record that can be furnished to host computing devices, e.g., during device discovery. Memory 215 can also store peripheral device state information and any other data that may be used during operation of keyboard 140. Memory 215 can also store program code executable to communicate with a communication interface 250.

Battery 220 can include any type of energy storage device including rechargeable and non-rechargeable devices. In some embodiments, battery 220 is nickel metal hydride, nickel cadmium, lithium-ion or lead acid configuration. One of skill in the art with the benefit of this disclosure will appreciate that other types of energy storage devices can be used. In some embodiments, battery 220 can be wirelessly rechargeable.

User interface keys 225 can include user-operable input devices such as one or more depressible keys. Each user interface key 225 can correspond to a unique signal that is communicated to processor 205 so the processor recognizes the user's desired input. In certain embodiments, user interface keys 225 can include any type of key that utilizes a key switch, as further described at least with respect to FIGS. 3-8E.

Visual/haptic output 230 can include any output device that can be used to communicate with a user. In some embodiments, lights can be turned on or off, lights can change colors, or lights can flash at different rates. Haptic devices can vibrate, ping or tap the keyboard, and in some embodiments, may include unbalanced motors that provide vibrations and/or voice coils. In various embodiments, a haptic device can be included in a base or wrist rest, or they can be key specific. Audible devices can emit beeps, tones, music, recorded messages and/or electronically generated messages. In some aspects, visual/haptic output 230, processor 205, or a combination thereof may control the lighting of one or more light emitting elements on the peripheral device (keyboard), as described in the various embodiments herein that relate to illuminating key caps via a light emitting element and corresponding light guide. In further embodiments, display screens can be used. In some embodiments, one or more light emitting elements that illuminate keys can be used as a digitized display screen. That is each key light can be used to display an alphanumeric message to the user. The message can be stationary and/or the message can scroll, and/or the message can include sequentially displayed characters. One of skill in the art with the benefit of this disclosure will appreciate that other types of visual/haptic output devices can be used without departing from this disclosure.

FIG. 2 also shows a simplified block diagram of an example host computing device, which may be illustrative of the features and functions of host device 110 illustrated in FIG. 1 (or other suitable host computing device(s)), according to certain embodiments. In some embodiments, host computing device 110 can implement any or all of the functions, behaviors, and capabilities described herein as being performed by a host computing device, as well as other functions, behaviors, and capabilities not expressly described. Host computing device 110 can include processing subsystem 255, storage device 260, network interface 265, and communication interface 250. Host computing device 110 can also include other components (not explicitly shown) such as a battery, power controllers, and other components operable to provide various enhanced capabilities. In various embodiments, host computing device 110 can be implemented in a desktop computer, laptop computer, tablet computer, smart phone, other mobile phone, wearable computing device, cellular phone or other systems having any form factor. Further, in some embodiments, host computing device 110 can be implemented partly in a base station and partly in a mobile unit that communicates with the base station and provides a user interface.

Communication interface 250 can provide voice and/or data communication capability for host computing device 110. In some embodiments, communication interface 250 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments, communication interface 250 can provide wired network connectivity (e.g., Ethernet) in addition to or instead of a wireless interface. Communication interface 250 can be implemented using a combination of hardware (e.g., driver circuits, antennas, modulators/demodulators, encoders/decoders, and other analog and/or digital signal processing circuits) and software components. In some embodiments, communication interface 250 can support multiple communication channels concurrently or at different times, using the same transport or different transports. Thus, for example, host computing device 110 can communicate with accessories via a local channel at some times and via a relay service at other times.

Processing subsystem 255 can be implemented as one or more integrated circuits, e.g., one or more single-core or multi-core microprocessors or microcontrollers, examples of which are known in the art. In operation, processing subsystem 255 can control the operation of host computing device 110. In various embodiments, processing subsystem 255 can execute a variety of programs in response to program code and can maintain multiple concurrently executing programs or processes. At any given time, some or all of the program code to be executed can be resident in processing subsystem 255 and/or in storage media such as storage device 260.

Through suitable programming, processing subsystem 255 can provide various functionality for host computing device 110. For example, in some embodiments, processing subsystem 255 can implement various processes (or portions thereof) described above as being implemented by a host computing device. Processing subsystem 255 can also execute other programs to control other functions of host computing device 110, including application programs that may be stored in storage device 260. In some embodiments, these application programs may interact with a peripheral device, e.g., by generating messages to be sent to the peripheral device and/or receiving responses from the peripheral device. Such interactions can be facilitated by a peripheral device management daemon and/or other operating system processes, e.g., as described above, and can include communicating with the peripheral device via a communication interface 250.

Storage device 260 can be implemented, e.g., using disk, flash memory, or any other non-transitory storage medium, or a combination of media, and can include volatile and/or non-volatile media. In some embodiments, storage device 260 can store one or more application and/or operating system programs to be executed by processing subsystem 255, including programs to implement various operations described above as being performed by a host computing device. For example, storage device 260 can store a uniform host application that can read a peripheral device description record and generate a graphical user interface for controlling the peripheral device based on information therein. Storage device 260 can also store program code executable to communicate with a communication module 210 of a peripheral keyboard device (e.g., keyboard 140). Although FIG. 2 illustrates communication interface 250 as a subsystem of host computing device 110, it is understood that communication interface 250 may be a dongle that is plugged into and electrically coupled with host computing device 110. In some embodiments, portions (or all) of the host computing device functionality described herein can be implemented in operating system programs rather than applications. In some embodiments, storage device 260 can also store applications ("apps") designed for specific accessories or specific categories of accessories.

Network interface 265 can include any type of connection to a network including wired Ethernet, RS-232 or other, and wireless including, data network technology such as 3G, 4G/LTE, Wi-Fi, other IEEE 802.11 family standards, or other mobile communication technologies, or any combination thereof, components for short-range wireless communication (e.g., using Bluetooth and/or Bluetooth LE standards, NFC, etc.), and/or other components. In some embodiments, network interface 265 can provide wired network connectivity (e.g., Ethernet) in addition to or instead of a wireless interface. Network interface 265 can be implemented using a combination of hardware (e.g., driver circuits, antennas, modulators/demodulators, encoders/decoders, and other analog and/or digital signal processing circuits) and software components.

Further, while a host is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Host computing devices and peripheral devices described herein can be implemented in electronic devices that can be of generally conventional design. Such devices can be adapted to communicate using a uniform peripheral device protocol that supports command-and-control operations by which a host (a first electronic device) can control operation of a peripheral device (a second electronic device). In some instances, a device can combine features or aspects of a host and a peripheral device, e.g., in the case of a proxy as described above.

It will be appreciated that the system configurations and components described herein are illustrative and that variations and modifications are possible. It is to be understood that an implementation of host computing device 110 can perform all operations described above as being performed by a media access device and that an implementation of keyboard 140 can perform any or all operations described above as being performed by a peripheral device. A proxy, bridge, tunnel, or coordinator can combine components of host computing device 110 and keyboard 140, using the same hardware or different hardware as desired. The media access device and/or peripheral device may have other capabilities not specifically described herein (e.g., mobile phone, global positioning system (GPS), broadband data communication, or Internet connectivity). Depending on implementation, the devices can interoperate to provide any functionality supported by either device (or both) or provide functionality that is partly implemented in each device. In some embodiments, a particular peripheral device can have some functionality that is not accessible or invocable via a particular media access device but is accessible via another host or by interacting directly with the peripheral device.

Further, while the media access device and peripheral device are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Figure 3:
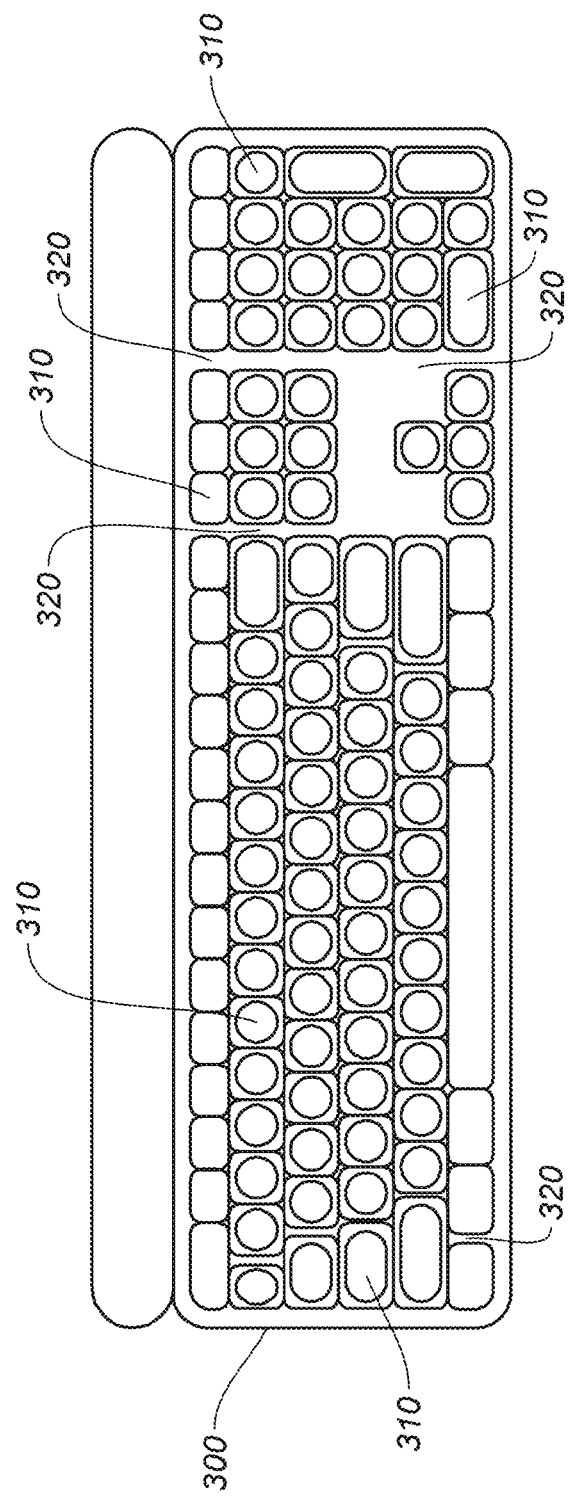
FIG. 3 shows a keyboard including a plurality of key structures from a top plan view, according to certain embodiments.

FIG. 3 shows a keyboard 300 including a plurality of key structures 310, according to certain embodiments. Keyboard 300 can include any suitable number and/or arrangement of key structures, and the key structures can be configured to trigger any suitable output including, but not limited to, an alphanumeric output, functional output (e.g., functional keys), directional (e.g., arrow keys), multiple outputs (e.g., a number and symbol), or the like. In some cases, a haptic output (e.g., vibration) or visual output (e.g., lighting) may be associated with one or more key structures. The key structures are arranged within and can be coupled to a key frame 320, which is also referred to as a "top plate," as further described below at least with respect to FIG. 4. The key structures of FIG. 3 only show the key caps for each key structure from a top plan view, however, a more detailed view and corresponding discussion of the novel features presented herein are better shown and described in FIGS. 4-9C.

Figure 4:
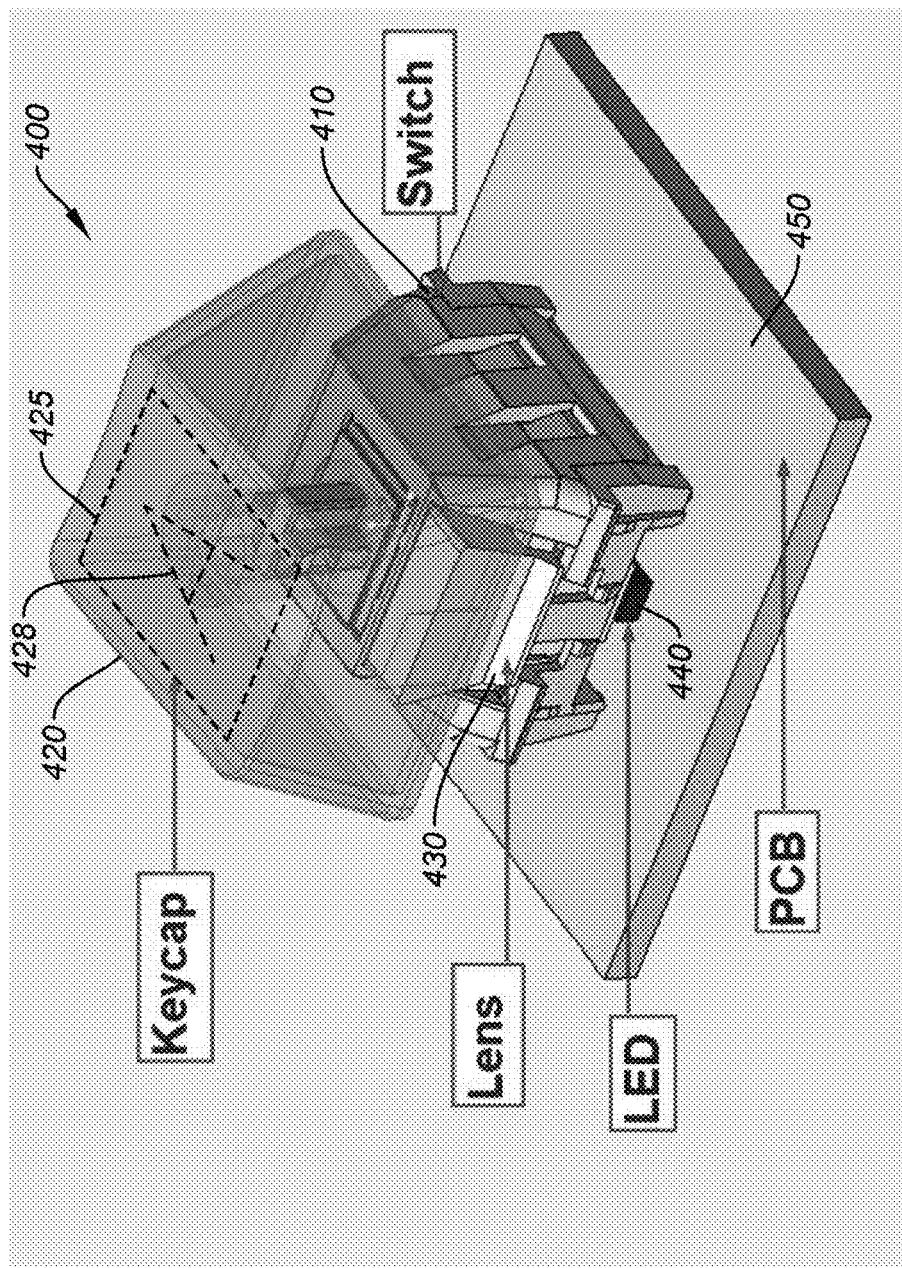
FIG. 4 shows aspects of a key structure, according to certain embodiments.

FIG. 4 shows aspects of a key structure 400 with a novel light guide structure, according to certain embodiments. Key structure 400 can include a key switch 410, a top plate (not shown), a key cap 420, a light guide 430 (e.g., a "lens"), a light emitting element (LED) 440, and a printed circuit board (PCB) 450.

A key switch is a mechanism that registers a key stroke and can vary in response profiles, sound, travel time, and travel distance. Many contemporary keyboards employ Cherry® "Mechanical X-Point"® or "MX" key switches, which exhibit excellent performance characteristics, including a wide range of possible force profiles (e.g., the "feel" of the key press) and operational longevity (e.g., over 50 million strokes before material signal degradation). Though key switches may differ, key switches typically include a stem and a corresponding precision coil spring forming a mechanical module that operates to define the operational characteristics of the key (e.g., linear operation, actuation force threshold, etc.), and a cross-mount (e.g., which can appear as a "plus" or cross on the top of the key switch, as shown for instance in FIG. 4). Key switches can include an upper housing, which covers the mechanical module, and can operate to facilitate precision guidance of the switching slide. Key switches may further include a cross-point contact (e.g., made of copper, gold, or other suitable conductive material) to close the electrical circuit when the key is depressed to trigger the key structure output. A housing base can serve as a base of the key switch and is often reinforced (e.g., with glass fiber) to achieve pressure stability and durability. Some key switches can have a tactile output, where the module has a noticeable and/or audible click point, or "clickiness," which is a distinctive feature of mechanical keyboards. Linear key switches typically do not include this type of physical feedback and have feedback with linear resistance characteristics. Some types of key switches can be configured for gaming (e.g., fast triggering with minimal activation force), office productivity (e.g., tactile with a detectable actuation point with or without a click), precision (e.g., tactile with high activation force), accuracy (e.g., linear with a tighter coil spring for quicker return to an at-rest position of the key switch), and speed (e.g., low activation force, short pre-travel, and linear switching), to name a few. One of ordinary skill in the art with the benefit of this disclosure would appreciate the many modifications, variations, and alternative embodiments thereof.

An LED can be any suitable semiconductor light source that emits light when current flows through it. Electrons in the semiconductor recombine with electron holes, releasing energy in the form of photons, which can be observed as light in any suitable color based on an amount of energy required for electrons to cross a band gap of the semiconductor. White light, for instance, can be achieved by using multiple semiconductor light sources or a layer of light-emitting phosphor on the semiconductor device. As compared to conventional incandescent light sources, LEDs can have relatively low energy consumption, longer operating life, more robust physical construction, smaller size, and faster switching. Thus, some keyboards may employ an LED for each key switch and in some cases, the power, intensity, and color of each LED can be independently controlled. In certain implementations, the LED can be integrated with the key switch (e.g., some Cherry MX-based keyboards employ key switch-integrated LEDs). However, unlike lasers, LEDs are not typically spectrally coherent nor substantially monochromatic, and its spectrum is narrow enough to appear as a saturated color. Further, LEDs are not typically spatially coherent (e.g., they typically have a wider dispersion pattern than lasers), so they typically do not achieve the high brightness of a laser. As a result, many of the LED-based and LED integrated systems have certain deleterious effects such as unevenly lit glyphs or a cramped glyph layout to ensure that each glyph falls within the field of illumination of the LED. Given these issues, and the limited brightness and illumination characteristics of an LED versus a laser or other more coherent light source in general, some aspects of the novel light guide structure described herein is to guide the dispersed light from the LED into the transparent portion of the key cap (e.g., in the shape of one or more glyphs, alphanumeric characters, etc.) with a brighter, more uniform, more efficient (e.g., less loss) and wider focused illumination pattern than other key lighting schemas, as further described below. LEDs can have any suitable mounting configuration (e.g., through-hole, surface mount, etc.) and can be mounted on any suitable substrate. Light emitting element 440 can be comprised of multiple LEDs each having a different base color that operate to proportionally affect an overall light color emitted by light emitting element(s) 440. Any suitable type of LED (e.g., common anode, common cathode, OLED, etc.) may be used, and more generally any suitable light emitting element(s) (e.g., LED, laser, incandescent, etc.) can be used, as would be appreciated by one of ordinary skill in the art with the benefit of this disclosure.

Light guide 430 is configured to optically couple light received from a light source (e.g., LED 440) to a user interface (e.g., key cap 420). Light guide 430 (also referred to as a "light pipe" or "light tube") is typically placed close to the light emitting element on one side of PCB 450 (e.g., distance "K" in FIG. 5). Light guide 430 is typically configured so that it is collinear with the light emitting element and with the transparent region of a keycap or a portion thereof. Light guide 430 may be configured in myriad shapes, dimensions, sizes, etc., with some exemplary embodiments presented herein, for example, in FIGS. 5-9C. In some aspects, a light diffuser (not shown) can be used to spread light over a defined area at the cost of some brightness and may work in conjunction with light guide 430. Light guide 430 can be comprised of optical acrylic and polycarbonate materials, however, other materials may be used as shown in the table below, and as would be appreciated by one of ordinary skill in the art with the benefit of this disclosure.

A refractive index of a material used for light guide 430 can typically range from 1.30 to 1.70. For example, the following materials may be used wherein the approximate refractive index is represented by n:

Plastic:
Acrylonitrile butadiene styrene (ABS), n=1.534
Polycarbonates (PC), n=1.496
Polymethyl methacrylate (PMMA), n=1.493
Polystyrene (PS), n=1.596
Polypropylene (PP), n=1.492
Glass, n=1.50~1.65
Silicone rubber, n=1.40~1.60

A top plate (not shown) can provide structural support for the key switch and can receive clips from key switch 410 that can engage with the top plate when the key switch is coupled to PCB 450, thereby securing the key structure within the keyboard. In some embodiments, a top plate can provide structural support for a plurality of key switches (e.g., >100 keys), which is shown as key frame 320 in FIG. 3. The top plate can extend laterally in any direction, which often appears as a top surface of the keyboard, although top plate 320 may be an intermediary layer. In some aspects, top plate 320 may be planar or may have contouring, for instance, in certain ergonomically contoured keyboards. For example, top plate 320 may have contours in two dimensions (e.g., an XY planar shape as shown in FIG. 4) or three dimensions (e.g., an XYZ shape for contoured surfaces) and the thickness of top plate 320 may vary. Top plate 320 is typically a single monolithic plate with multiple holes to accommodate at least one key structure. However, top plate 320 may include a single hole (e.g., shown in FIG. 4 as a square ring shape) or multiple holes, and top plate 320 may be comprised of multiple continuous or discontinuous sections that can be planar or non-planar. One of ordinary skill in the art with the benefit of this disclosure would appreciate the many modifications, variations, and alternative embodiments thereof.

In certain embodiments, a bottom side of key switch 410 may couple to a top surface of a substrate (e.g., PCB 450), as shown in FIG. 4. A printed circuit board, or PCB, is a general term for a technology that allows a conductor to run from one location on the board to another location on the board and from one layer to another, as would be appreciated by one of ordinary skill in the art with the benefit of this disclosure. In some cases, a post (not shown) from key switch 410 may pass partially or fully through PCB 450, which may add stability of the key structure in PCB 450. Although PCBs are primarily shown and described throughout the disclosure, other types of boards, such as printed wiring boards (PWBs) can be used and typically comprise an epoxy glass substrate to create electrical interconnections and for connecting to components to create electronic circuits. More generically, PCBs, PWBs, etc., can be referred to as a substrate. For the purposes of the present disclosure, PCBs and PWBs can be used interchangeably, and any other type of substrate or mounting surface can be used with the novel key structure arrangement described herein, as would be appreciated by one of ordinary skill in the art with the benefit of this disclosure.

Keycap 420 can include one or more sidewalk to shield and protect internal portions of mechanism key structure 400 (e.g., in combination with the top plate) and prevent foreign particles from entering the internal portions of the key structure. For example, key switch 410 and light guide 430 may be located within a cavity defined by keycap 420 and its corresponding sidewalls. Further, all of the interior portions of key structure 400, including the key switch, light guide, light emitting element, and substrate may be obscured and protected due in part to the combination of the key cap and top plate, as shown in FIG. 3. The limitations of the physical space within this cavity can present challenges to the design of light guide. For example, the key cap and top portion of the key switch is depressible relative to the PCB, light emitting element, and light guide, for example. Thus, the light guide may be designed to illuminate a transparent area and corresponding glyphs when the key cap is in an undepressed state.

Transparent region 425 can include one or more surface features 428 that can be viewable by a user of an illuminated keyboard using key structure 400. Surface features 428 can include alphanumeric symbols (more generally "glyphs"), phrases (e.g., Delete, Home, PgUp, etc.), operating system specific symbols (e.g., a Windows or Mac key), Chinese character(s), system functions (e.g., volume up or volume down), etc., application symbols (e.g., calculator, lock screen, etc.), and the like. The surface features can be illuminated to allow a user of the keyboard to more easily determine the function of a key to process. This can be useful, for example, if the keyboard is in a dark environment where non-illuminated symbols may not be visible to the user. The illumination can be in a monotone color or can be multi-colored. In other words, the color for each key can be changed over time using combinations of different colored light sources that illuminate light guide 430 and transparent region 425. Parts of transparent region 425 and/or surface features 428 can be transparent to allow light to pass through and reach the eye of a user of keyboard 300. It should be understood that the transparent region can have any suitable amount of transparency from near opaque to nearly clear and colorless. In some embodiments, and as may be applied to all instances of a transparent region described throughout, the transparent region may have any amount of transparency (from opaque to clear), "milky," painted, or the like. In some cases, white paint and/or a diffuser is added to the key cap making it appear "milky," and operates to better disperse light over the desired region.

By way of example, some embodiments may include a keyboard key structure including a substrate, a key switch having a top, a bottom, and a side, where the bottom of the key switch is configured to be coupled to the substrate. The key structure can also include a keycap including a transparent region, the key cap configured to be coupled to the top of the key switch, and a light guide coupled to the side of the key switch, the light guide including a planar bottom surface and a planar top surface that is wider than and parallel to the bottom surface. The key structure may further include a light emitting element coupled to the substrate and configured under the bottom surface of the light guide such that the light emitting element, the light guide, and the transparent region of the key cap configured in a collinear arrangement. The light emitting element can be operable to emit light into the bottom surface of the light guide, and the light guide may direct the light entering the bottom surface through a body of the light guide, out of the top surface of the light guide, and through the transparent region of the key cap.

FIG. 5 shows various dimensions and relative locations of the various elements of a simplified model of a light guide structure including a light emitting element 440, a light guide 430, and a transparent region 425, according to certain embodiments. As disclosed herein, features of light guide 430 and its location relative to light emitting element 440 and transparent region 425 may be selected to provide satisfactory illumination uniformity for transparent region 425 (or corresponding glyph 428), satisfactory efficiency in light transmitted from light emitting element to transparent region 425, and to fall within physical constraints of cavities defined by the dimensions and travel path of the corresponding key cap.

Referring to FIG. 5, the dimensions of LED 440 can be defined by a width E (x-dimension), a height F (z-dimension), and a depth or thickness G (y-dimension). The dimensions of light guide 430 can be defined by a bottom surface (proximate end) A (x-dimension), a top surface (distal end) B (x-dimension), a distance C defining a distance between A and B (z-dimension), and a depth or thickness T (y-dimension). The dimensions of transparent region 425 (e.g., a portion of key cap 420) can be defined by a width H (x-dimension), height J (z-dimension), and depth or thickness I (y-dimension). A distance between LED 440 and light guide 430 is defined by a distance K (z-dimension). A distance between the top surface of light guide 430 and a bottom surface of the transparent region 425 is defined by a distance D (z-dimension).

Though embodiments may differ substantially, as evidenced by the various permutations disclosed herein (see, e.g., FIGS. 6A-6F, 7B-7C, 8B-8E, and 9B-9C), some of the embodiments may share common features. For example, some embodiments employ a uniform thickness for the light guide (e.g., 1-3.5 mm inclusive); a flat and parallel top surface and bottom surface, a trapezoidal shape (e.g., isosceles); a width of B being at least twice a length of the width of A; a height of at least 5 mm; a collinear arrangement of the light emitting element, the light guide, and the transparent region; a depth of light emitting element 440 being less than or equal to the depth of light guide 430; distance K being between 0-0.3 mm; transparent region (or the region intended to be illuminated, such as a glyph or more generally at least a portion of transparent region 425) having a depth equal to at least the depth of light guide 430 (T) plus 2 mm; transparent region 425 can have a width H that is less than or equal to a corresponding length B of light guide 430, transparent region 425 can have a height J that is greater than or equal to 0.8 mm, or the like. Some embodiments may share some, all, or none of these features, and are presented to provide non-limiting examples of how some features can be implemented.

Figure 6A:
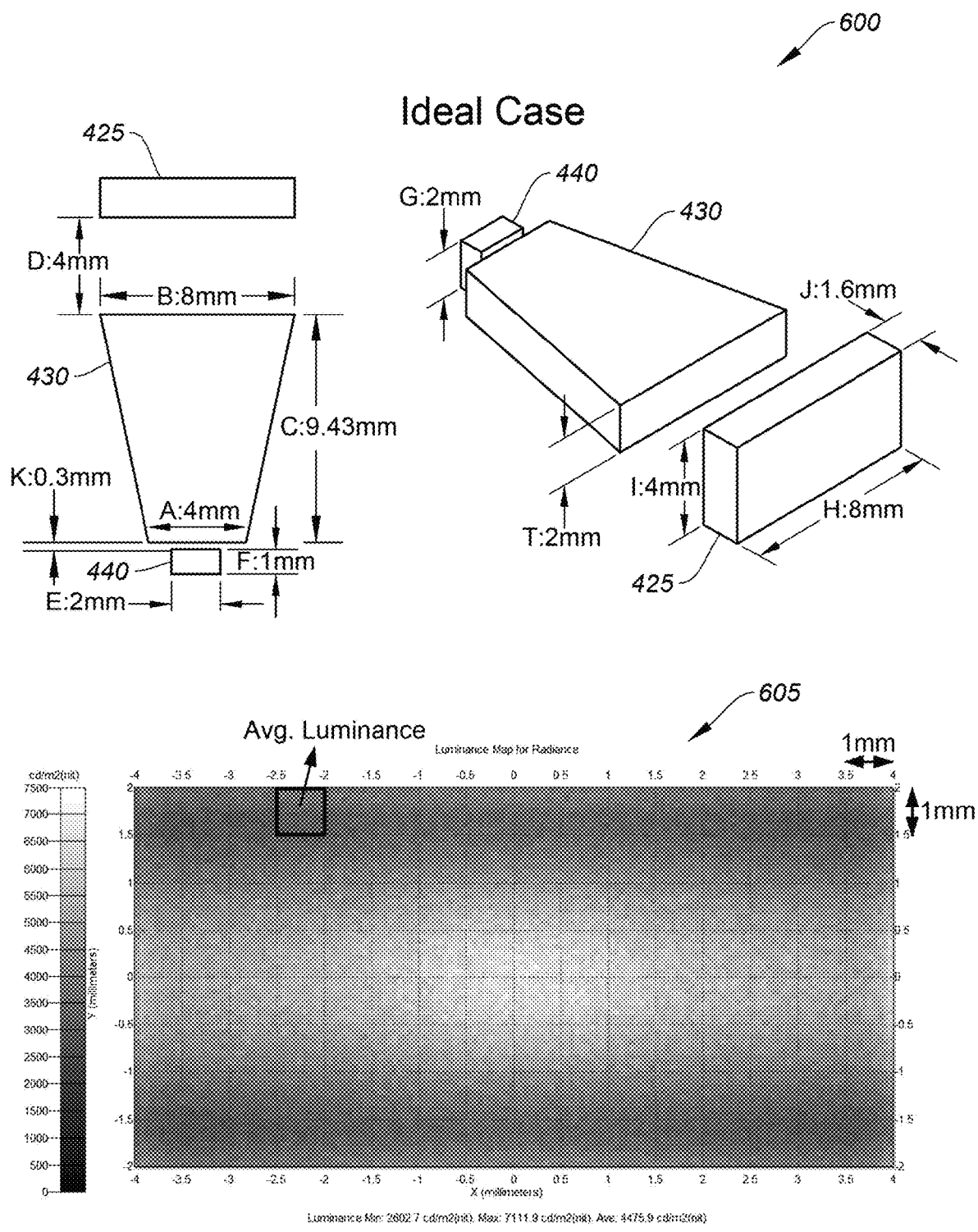
FIG. 6A shows an exemplary embodiment of a light guide with corresponding performance characteristics, according to certain embodiments.

FIG. 6A shows an exemplary embodiment of a light guide with corresponding performance characteristics, according to certain embodiments. The embodiment of FIG. 6A exhibits good illumination characteristics for transparent region 425 due to the light transmission properties of light guide 430. The dimensions of light guide 430 may be selected based not only on the goal of efficiency coupling light from its input region (e.g., defined by A×T) to its output region (e.g., defined by B×T), but also factoring the distances K and D, which may be material considerations for ensuring that the light delivered to transparent region 425 is sufficiently uniform in brightness and/or color and has a sufficiently broad illumination area. Several other embodiments (e.g., FIGS. 6B-6E, and others) are presented with different dimensions to exhibit how certain dimensions, contours, and distances can affect illumination characteristics of the system. Thus, in certain embodiments, including light guide system 600 of FIG. 6A, the light guide dimension parameters may correspond to the following exemplary values and ranges:

Light Guide Dimensions: B=2A; C≥5 mm; D≥4 mm

Light Guide Thickness (Depth): 1≤T≤3.5 mm

Lighting area (Transparent Region or Glyph): H≤B mm; I≤T+2 mm; J≥0.8 mm

LED dimension: E≤A and G≤T;

Gap between LED and Light Guide: 0 mm<K≤0.3 mm

In summary, certain exemplary embodiments of the LED/light guide/transparent region structure may be configured such that light guide should have a top surface B that is twice the length of its bottom surface A; a height of the light guide C should be greater than or equal to 5 mm; a distance between the top surface of the light guide and the key cap D should be greater than or equal to 4 mm; the depth (thickness) of the light guide T should be between 1 mm and 3.5 mm inclusive; the transparent region width H should be less than or equal to the width of the top surface of the light guide B; a depth (thickness) I of the transparent region should be less than or equal to the depth of the light guide+2 mm; a height of the transparent region should be greater than or equal to 0.8 mm; the LED width E should be less than or equal to the width of the light guide A; the depth (thickness) of the LED G should be less than or equal to the depth of the light guide; and the gap between the LED and light guide K should be greater than 0 mm and less than or equal to 0.3 mm.

Referring to FIG. 6A and the reference variables of FIG. 5, light guide system 600 includes the dimensions as presented below in Table 1, which provides illumination parameters including an average luminance, uniformity, and luminance ratio for the light guide system (e.g., combination of LED, light guide, and transparent region). The formulas for the illumination parameters are provided in equations 1-3 below.

$$\text{Average Luminance} = \frac{\text{(Sum of Luminance for each Pixel)}}{\text{(Sum of Total No. of Pixels)}} \quad (1)$$

$$\text{Luminance Uniformity } (1 \times 1 \text{ mm as 1 cell}) = \frac{\text{Avg Luminance Min}}{\text{Avg Luminance Max}} * 100 \quad (2)$$

$$\text{Luminance Ratio} = \frac{L1}{L2} \quad (3)$$

TABLE 1

Dimensions and Illumination Characteristics for Light Guide System 600
Dimensions for Light Guide System 600

| System Element | Var | Description | Value | Distances/Illumination Char. | Value |
|---|---|---|---|---|---|
| Light Guide (LG) | A | Btm Width | 4 mm | Distance LED to LG (K): | 0.3 mm |
| | B | Top Width | 8 mm (0.5A) | | |
| | C | Height | 9.43 mm | Distance LG to TR (D): | 4 mm |
| | T | Depth | 2 mm | | |
| | | | | Avg. Luminance (nits): | 4495 |
| Light Emitting Element (LED) | E | Width | 2 mm | | |
| | F | Height | 1 mm | | |
| | G | Depth | 2 mm | | |
| | | | | Uniformity (1 × 1 mm): | 57% |
| Transparent Region (TR) | H | Width | 8 mm | | |
| | I | Depth | 4 mm | Luminance ratio: | 1 |
| | J | Height | 1.6 mm | | |

The unit of luminance (brightness) is Nit, defined as candela/m². The average luminance and luminance uniformity (e.g., for 1×1 mm as 1 cell) may be used to judge the optical performance of the light guide system (e.g., the combination of the LED, light guide, and key cap or transparent region—also referred to as a "light system"). When the average luminance is relatively high, light systems tend to be more efficient (e.g., more light is coupled from the LED to the transparent region). When the average luminance uniformity is relatively high, the uniformity of the lighting system is better (e.g., even distribution of light over the desired region). Both of these indexes may be considered to more reliably judge the optical performance of a light system. The luminance ratio is the average luminance of the present light system L1 divided by an exemplary or ideal light system L2, such that when the luminance ratio is greater than 1, the L1 lighting system has a better average luminance than L2, and when the luminance ration is less than 1, the L1 lighting system has a lower average luminance than L2.

As described above, light guide system 600 has exemplary illumination characteristics due in part to the light guide having a preferred B=2A ratio. Light guide system 600 is an exemplary embodiment (which may be designated as L2) and has a relatively high average luminance (4495 nits) over the entire transparent region of 425, a uniformity of 57%, and luminance ratio of 1 (as an exemplary embodiment, it is compared to itself, e.g., L1=L2). The exemplary illumination characteristics are visibly evident in the broad and uniform luminance pattern that is evenly distributed over most of transparent region 425, as depicted in graph 605 of FIG. 6A. Thus, glyphs configured over most areas of the transparent region may have good illumination characteristics.

Figure 6B:
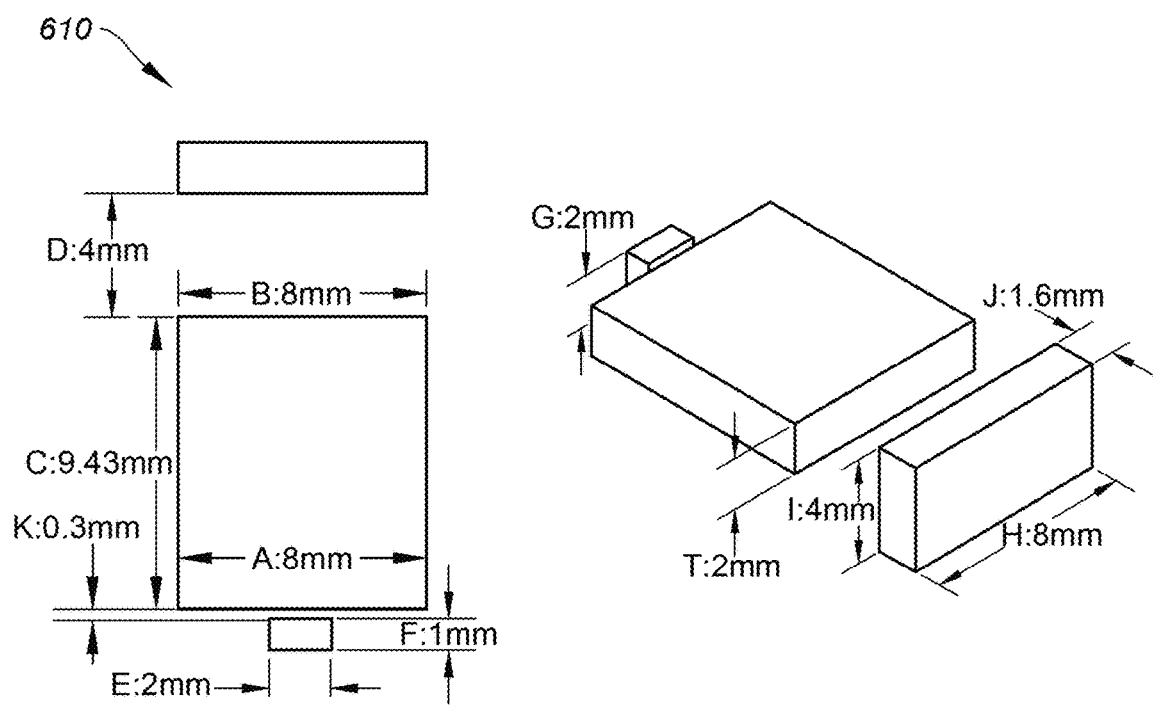
FIGS. 6B-6F show light guides having different dimensions with their corresponding performance characteristics.
Figure 6B:
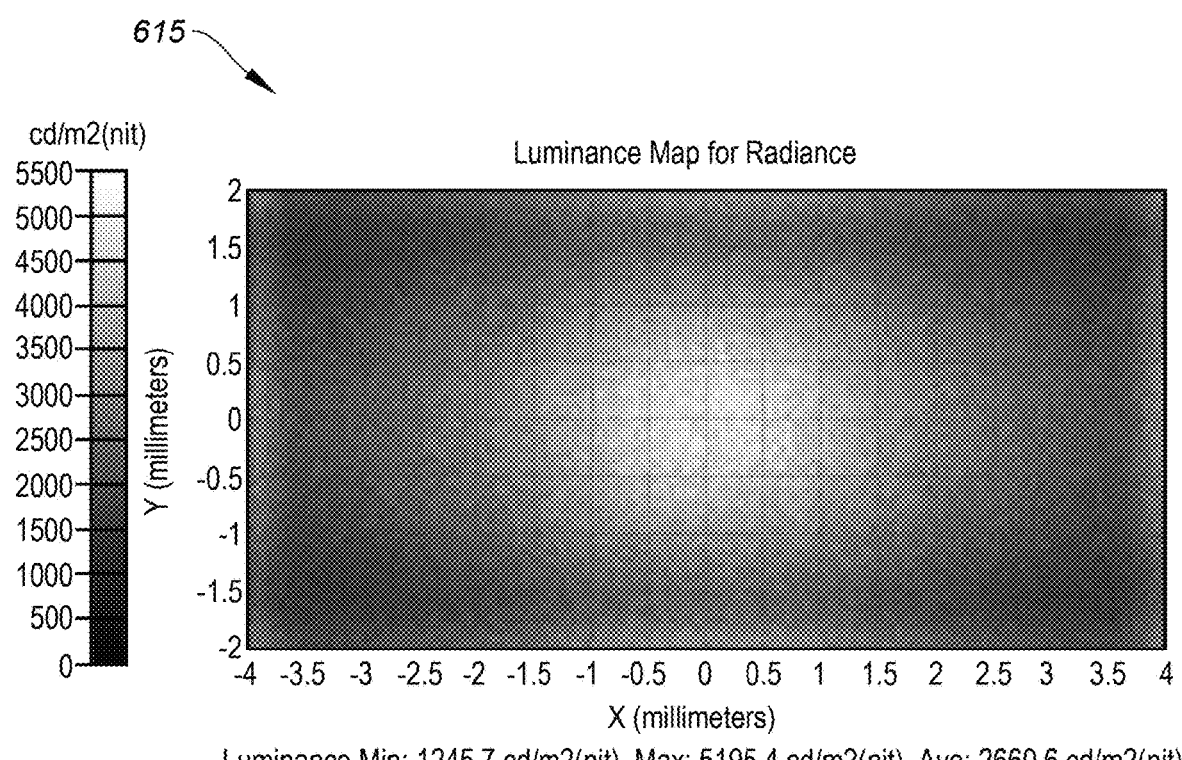

In FIG. 6B, light guide system 610 shows an example of a light guide with a non-preferred B=A configuration (e.g., as compared to the preferred B=2A configuration). As shown in Table 2 below, light guide system 610 has a comparatively low average luminance (2637 nits) over the entire transparent region 425, a comparatively low uniformity of 41%, and a low luminance ratio of 0.58, as compared to the exemplary embodiment of FIG. 6A. These non-preferred illumination characteristics are visibly evident in graph 615 of FIG. 6B as the illuminated spot is primarily centered over a middle portion of transparent region 425. Thus, glyphs configured along the edges of the transparent region for light guide system 610 may have poor illumination characteristics.

TABLE 2

Dimensions and Illumination Characteristics for Light Guide System 610
Dimensions for Light Guide System 610

| System Element | Var | Description | Value | Distances/Illumination Char. | Value |
|---|---|---|---|---|---|
| Light Guide (LG) | A | Btm Width | 8 mm | Distance LED to LG (K): | 0.3 mm |
| | B | Top Width | 8 mm (A) | | |
| | C | Height | 9.43 mm | Distance LG to TR (D): | 4 mm |
| | T | Depth | 2 mm | | |
| | | | | Avg. Luminance (nits): | 2637 |
| Light Emitting Element (LED) | E | Width | 2 mm | | |
| | F | Height | 1 mm | | |
| | G | Depth | 2 mm | | |
| | | | | Uniformity (1 × 1 mm): | 41% |
| Transparent Region (TR) | H | Width | 8 mm | | |
| | I | Depth | 4 mm | Luminance ratio: | 0.58 |
| | J | Height | 1.6 mm | | |

Figure 6C:
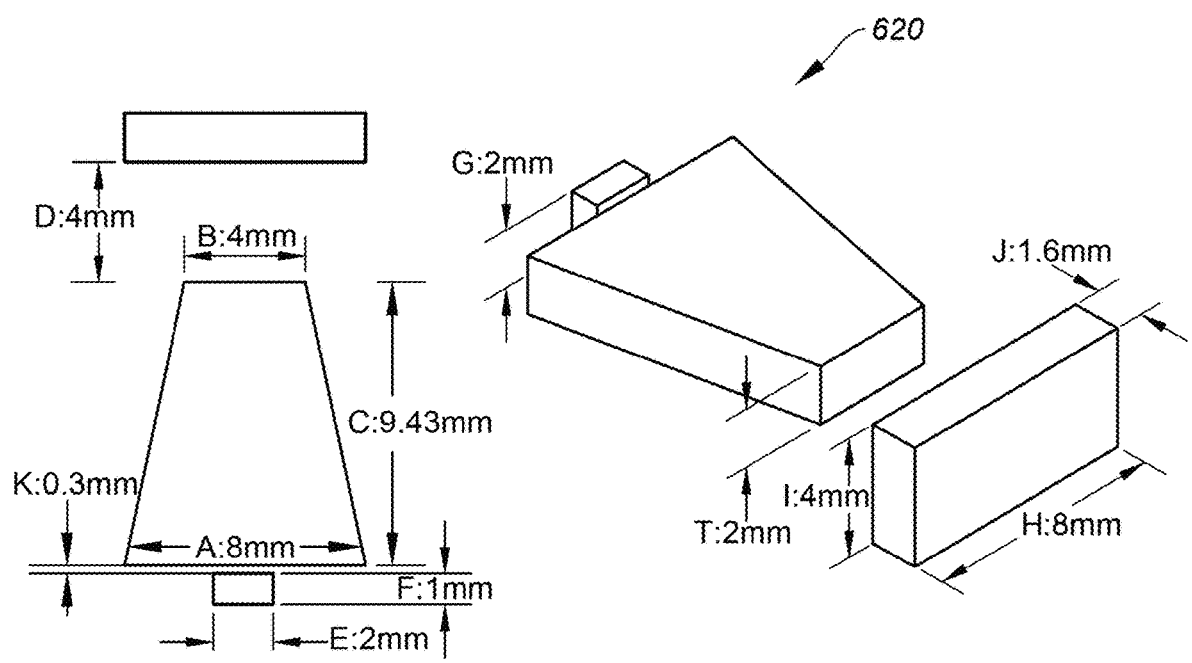
Figure 6C:
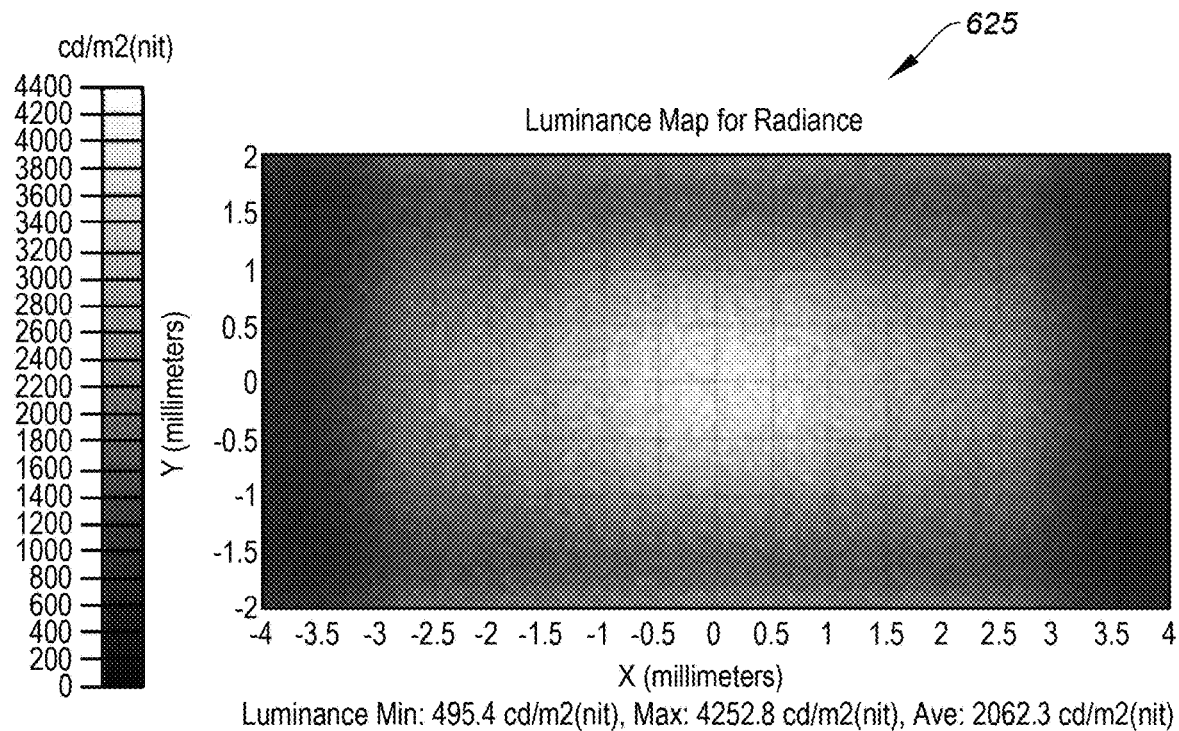

In FIG. 6C, light guide system 620 shows an example of a light guide with a non-preferred B=0.5A configuration (e.g., with B=4 mm and A=8 mm; this deviates from the preferred B=2A configuration). As shown in Table 3 below, light guide system 620 has a comparatively low average luminance (2068 nits) over the entire transparent region 425, a comparatively low uniformity of 24%, and a low luminance ratio of 0.46, as compared to the exemplary embodiment of FIG. 6A. These non-preferred illumination characteristics are visibly evident in graph 625 of FIG. 6C as a non-uniform illuminated spot that is primarily centered over a middle portion of transparent region 425 with very dark (non-illuminated) regions near the ends of transparent region 425. Thus, glyphs configured along the edges of the transparent region for light guide system 620 may have poor illumination and uniformity, which may cause bright and dark spots in certain glyphs depending on their location within the transparent region.

TABLE 3

Dimensions and Illumination Characteristics for Light Guide System 620
Dimensions for Light Guide System 620

| System Element | Var | Description | Value | Distances/Illumination Char. | Value |
|---|---|---|---|---|---|
| Light Guide (LG) | A | Btm Width | 8 mm | Distance LED to LG (K): | 0.3 mm |
| | B | Top Width | 4 mm (0.5A) | | |
| | C | Height | 9.43 mm | Distance LG to TR (D): | 4 mm |
| | T | Depth | 2 mm | | |
| | | | | Avg. Luminance (nits): | 2068 |
| Light Emitting Element (LED) | E | Width | 2 mm | | |
| | F | Height | 1 mm | | |
| | G | Depth | 2 mm | | |
| | | | | Uniformity (1 × 1 mm): | 24% |
| Transparent Region (TR) | H | Width | 8 mm | | |
| | I | Depth | 4 mm | Luminance ratio: | 0.46 |
| | J | Height | 1.6 mm | | |

Figure 6D:
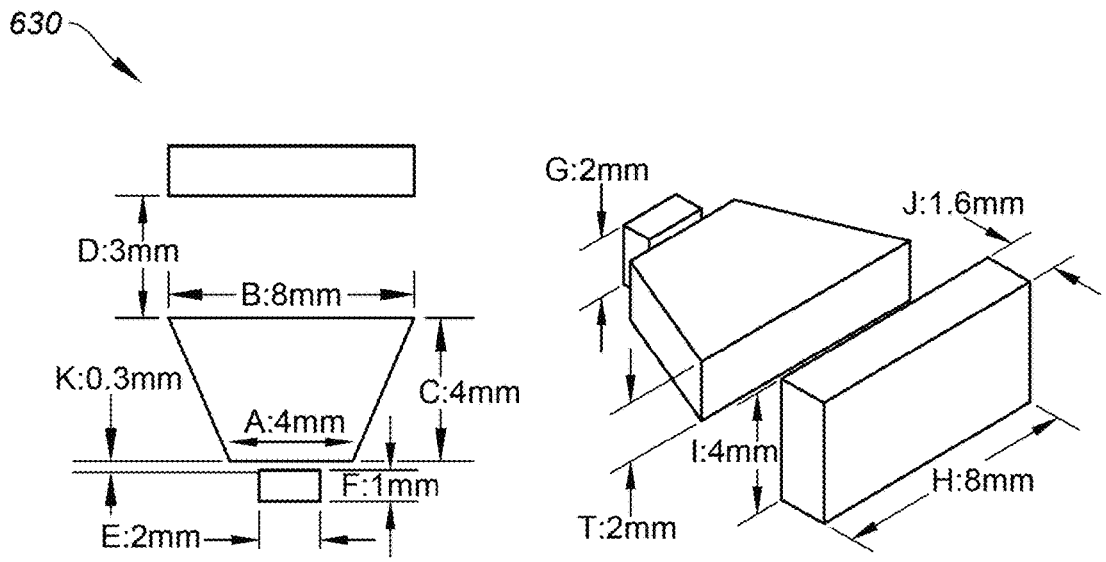
Figure 6D:
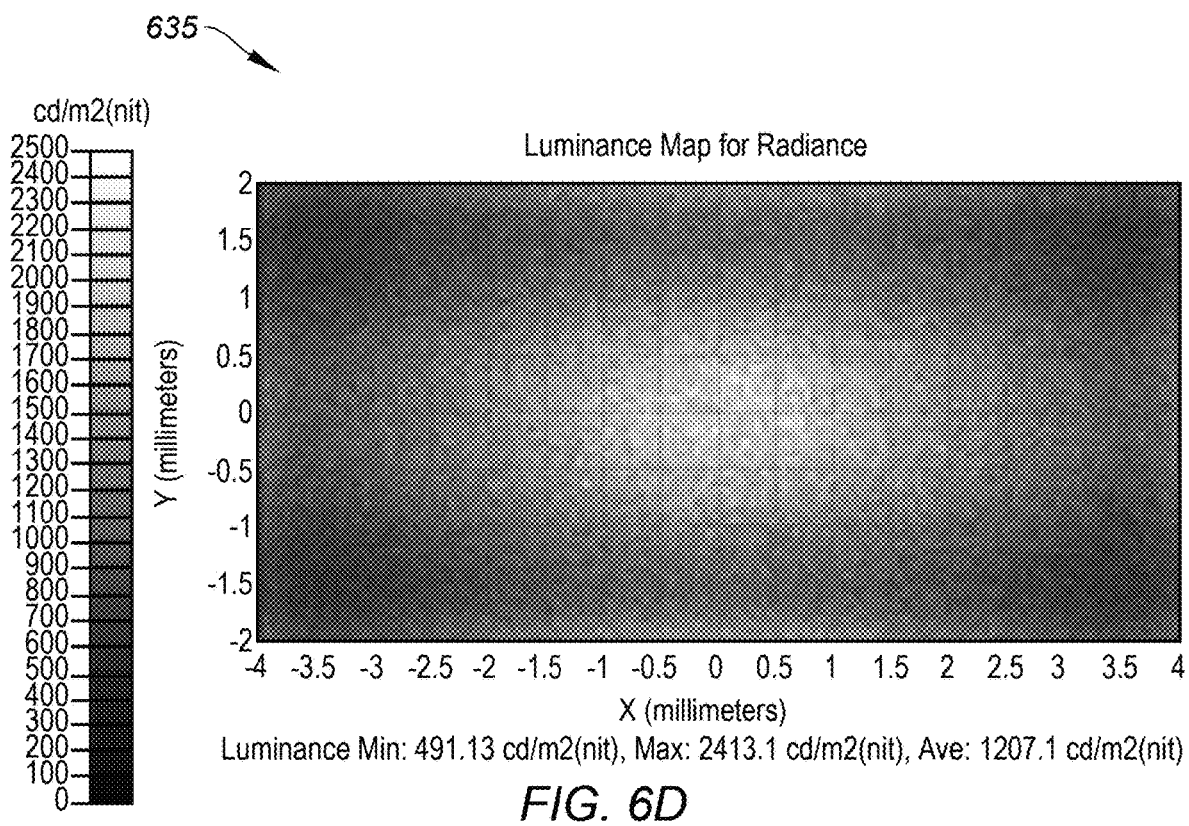

In FIG. 6D, light guide system 630 shows an example of a light guide that deviates from the preferred C≥5 mm and D≥4 mm configuration, with non-preferred values of C=4 mm and D=3 mm. As shown in Table 4 below, light guide system 630 has a comparatively low average luminance (1196 nits) over the entire transparent region 425, a comparatively low uniformity of 41%, and a low luminance ratio of 0.27, as compared to the exemplary embodiment of FIG. 6A. These non-preferred illumination characteristics are visibly evident in graph 635 of FIG. 6D as a non-uniform illumination pattern. As described above, exemplary light guide system dimensions may adhere to the design guides presented herein and deviations of typically 1 mm or more in any conjugation (e.g., any dimension described herein) may result in a notable degradation in average luminance and uniformity. Referring to FIG. 6D, and due to said degradations described above, glyphs configured along the edges of the transparent region for light guide system 630 may have poor illumination and uniformity, which may cause bright and dark spots in certain glyphs depending on their location within the transparent region.

TABLE 4

Dimensions and Illumination Characteristics for Light Guide System 630
Dimensions for Light Guide System 630

| System Element | Var | Description | Value | Distances/Illumination Char. | Value |
|---|---|---|---|---|---|
| Light Guide (LG) | A | Btm Width | 4 mm | Distance LED to LG (K): | 0.3 mm |
| | B | Top Width | 8 mm | | |
| | C | Height | 4 mm | Distance LG to TR (D): | 3 mm |
| | T | Depth | 2 mm | | |
| | | | | Avg. Luminance (nits): | 1196 |
| Light Emitting Element (LED) | E | Width | 2 mm | | |
| | F | Height | 1 mm | | |
| | G | Depth | 2 mm | | |
| | | | | Uniformity (1x1 mm): | 41% |
| Transparent Region (TR) | H | Width | 8 mm | | |
| | I | Depth | 4 mm | Luminance ratio: | 0.27 |
| | J | Height | 1.6 mm | | |

Figure 6E:
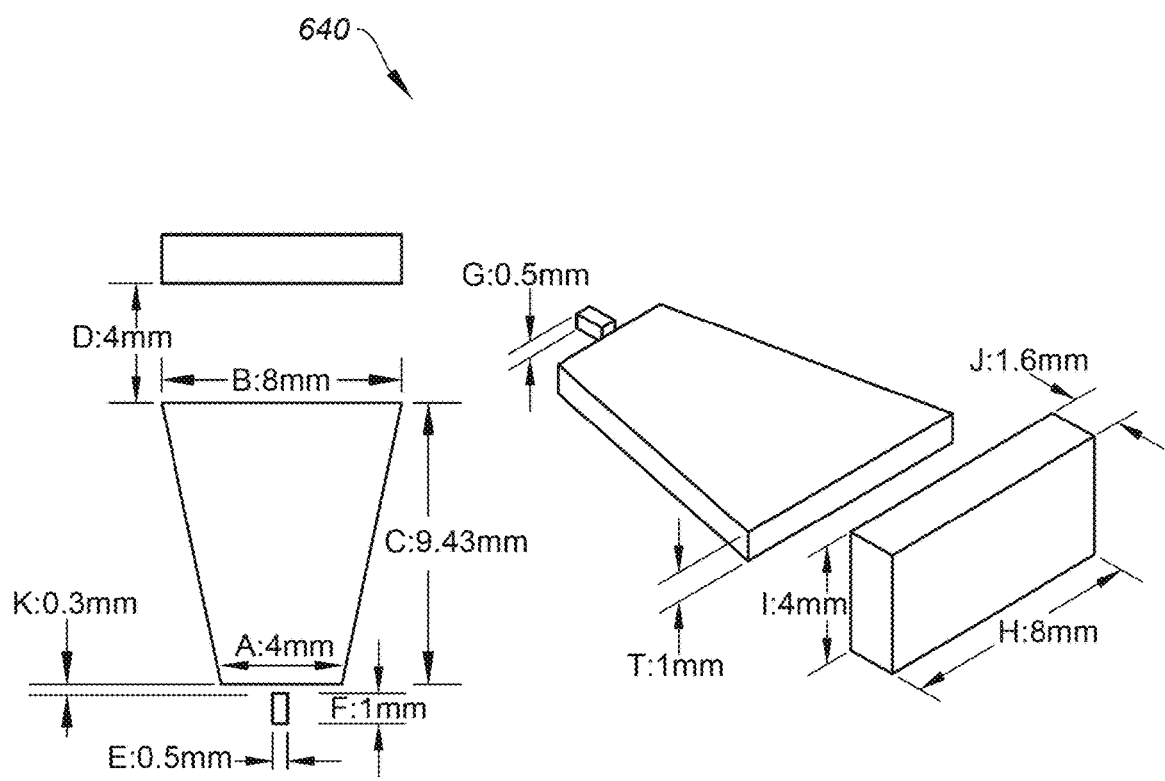
Figure 6E:
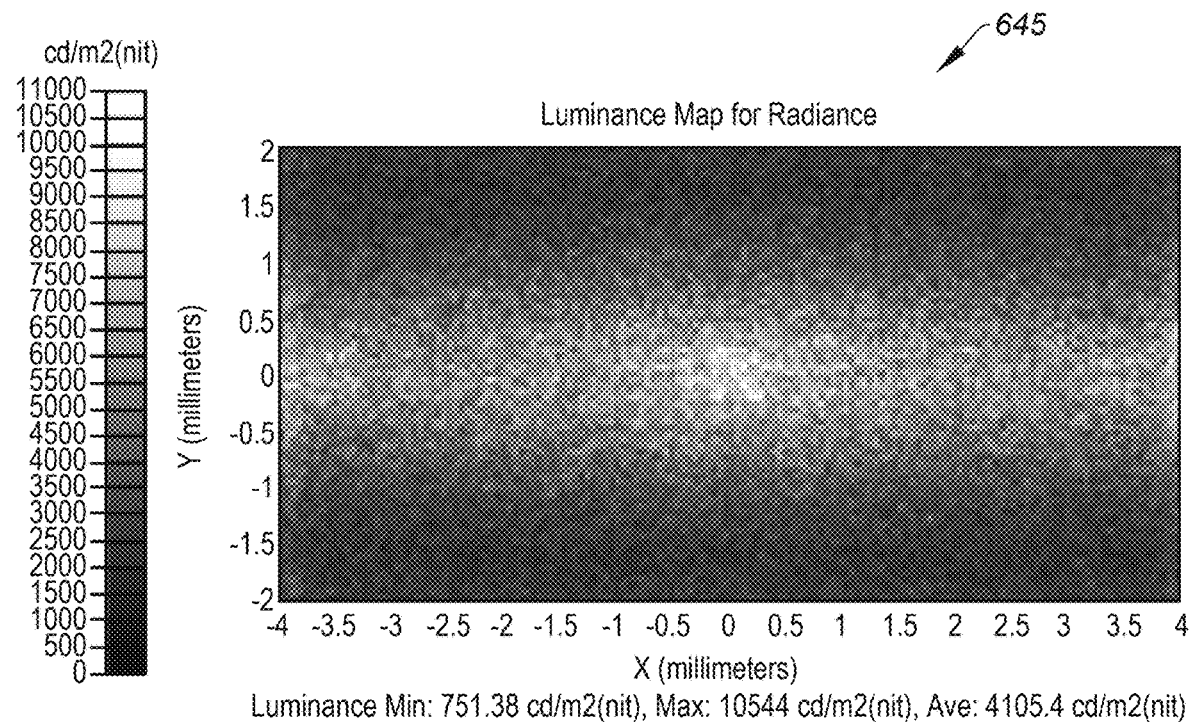

In FIG. 6E, light guide system 640 shows an example of a light guide that deviates from the preferred light guide depth/thickness of 1≤T≤3.5 mm, with a non-preferred value of T=0.5 mm, and non-ideal LED dimensions of 0.5 mm×0.5 mm×1 mm. As shown in Table 5 below, light guide system 640 has a comparatively satisfactory average luminance (4104 nits) over the entire transparent region 425, a comparatively low uniformity of 40%, and a lower luminance ratio of 0.91, as compared to the exemplary embodiment of FIG. 6A. These non-preferred illumination characteristics are visibly evident in graph 645 of FIG. 6E as a non-uniform illumination pattern. Referring to FIG. 6E, glyphs configured along the edges of the transparent region for light guide system 640 may have reasonably good illumination and uniformity along a narrow strip along the center of the transparent region, but poor illumination characteristics along the top and bottom borders, as shown. This is due in large part to the thinner light guide, which does not adequately couple light to all areas of the transparent region.

TABLE 5

Dimensions and Illumination Characteristics for Light Guide System 640
Dimensions for Light Guide System 640

| System Element | Var | Description | Value | Distances/Illumination Char. | Value |
|---|---|---|---|---|---|
| Light Guide (LG) | A | Btm Width | 4 mm | Distance LED to LG (K): | 0.3 mm |
|  | B | Top Width | 8 mm |  |  |
|  | C | Height | 9.43 mm | Distance LG to TR (D): | 4 mm |
|  | T | Depth | 0.5 mm |  |  |
|  |  |  |  | Avg. Luminance (nits): | 4104 |
| Light Emitting Element (LED) | E | Width | 0.5 mm |  |  |
|  | F | Height | 1 mm |  |  |
|  | G | Depth | 0.5 mm |  |  |
|  |  |  |  | Uniformity (1 × 1 mm): | 40% |
| Transparent Region (TR) | H | Width | 8 mm |  |  |
|  | I | Depth | 4 mm | Luminance ratio: | 0.91 |
|  | J | Height | 1.6 mm |  |  |

Figure 6F:
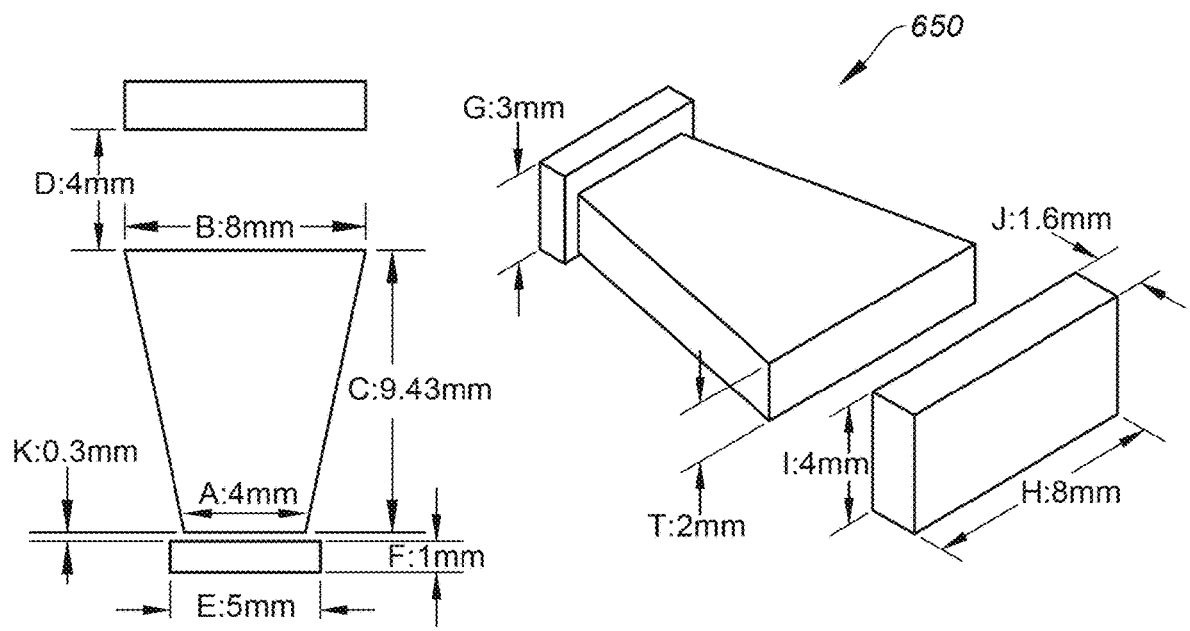
Figure 6F:
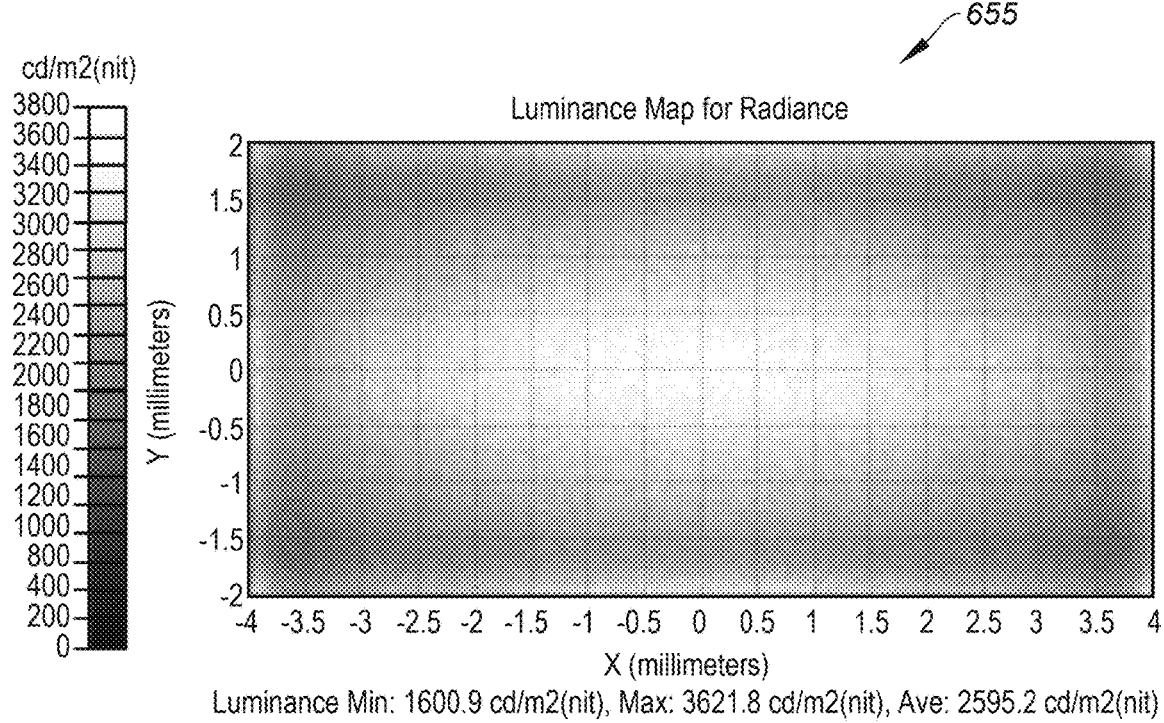

In FIG. 6F, light guide system 650 shows an example of a light guide that deviates from the preferred LED dimensions E≤A and G≤T, with a non-preferred dimensions of 5 mm×3 mm×1 mm. As described above, good light guide system design should have the LED width E be less than or equal to the width of the light guide A and the depth of the LED G should be less than or equal to the depth of the light guide, according to certain embodiments. As shown in Table 6 below, light guide system 650 has a comparatively low average luminance (2508 nits) over the entire transparent region 425, a uniformity of 63%, and a luminance ratio of 0.58, as compared to the exemplary embodiment of FIG. 6A. Lighting efficiency is not ideal due to poor light coupling (e.g., dimensions of the LED exceed those dimensions in the light guide). These non-preferred illumination characteristics are evident in graph 655 of FIG. 6F as a non-uniform illumination pattern. It should be noted that the luminance patterns is not normalized in the graphs presented herein and may include different scales. Referring to FIG. 6F, despite a good uniformity, luminance is relatively quite low as compare to light guide system 600, although it is not as evident from graph 655 due to the different luminance scales, as would be appreciated by one of ordinary skill in the art with the benefit of this disclosure.

TABLE 6

Dimensions and Illumination Characteristics for Light Guide System 650
Dimensions for Light Guide System 650

| System Element | Var | Description | Value | Distances/Illumination Char. | Value |
|---|---|---|---|---|---|
| Light Guide (LG) | A | Btm Width | 4 mm | Distance LED to LG (K): | 0.3 mm |
|  | B | Top Width | 8 mm |  |  |
|  | C | Height | 9.43 mm | Distance LG to TR (D): | 4 mm |
|  | T | Depth | 2 mm |  |  |
|  |  |  |  | Avg. Luminance (nits): | 2508 |

TABLE 6-continued

Dimensions and Illumination Characteristics for Light Guide System 650
Dimensions for Light Guide System 650

| System Element | Var | Description | Value | Distances/Illumination Char. | Value |
|---|---|---|---|---|---|
| Light Emitting Element (LED) | E | Width | 5 mm | | |
| | F | Height | 1 mm | | |
| | G | Depth | 3 mm | | |
| | | | | Uniformity (1 × 1 mm): | 63% |
| Transparent Region (TR) | H | Width | 8 mm | | |
| | I | Depth | 4 mm | Luminance ratio: | 0.58 |
| | J | Height | 1.6 mm | | |

Figure 7A:
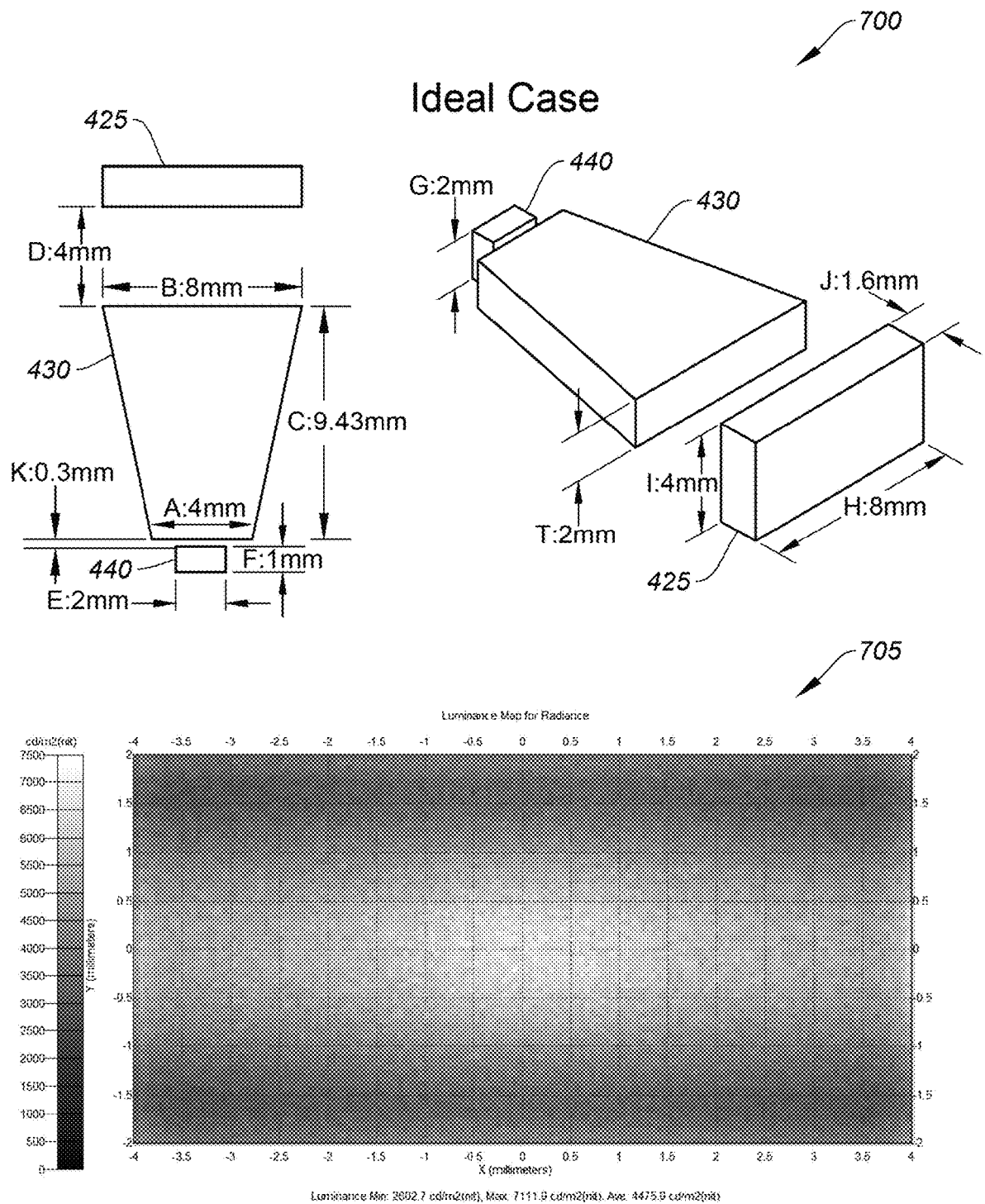
FIG. 7A shows an exemplary embodiment of a light guide and key cap with a different lighting area along a first dimension with corresponding performance characteristics, according to certain embodiments.
Figure 7B:
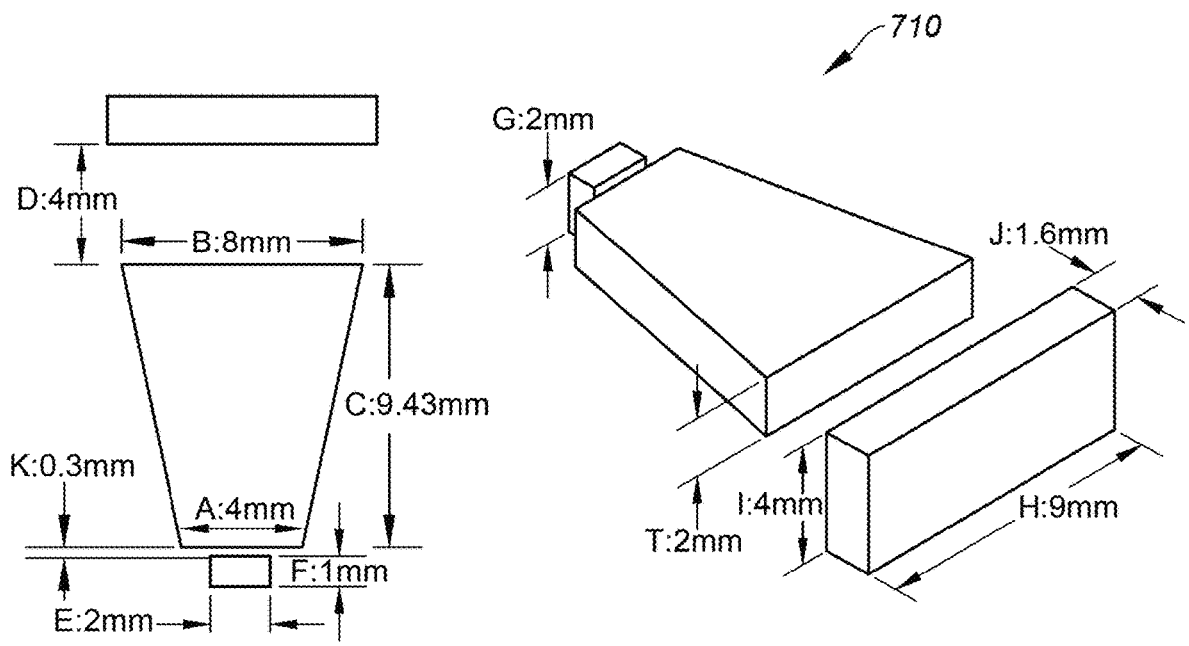
FIGS. 7B-7C show light guides having different dimensions with the different lighting area along the first dimension and their corresponding performance characteristics.
Figure 7B:
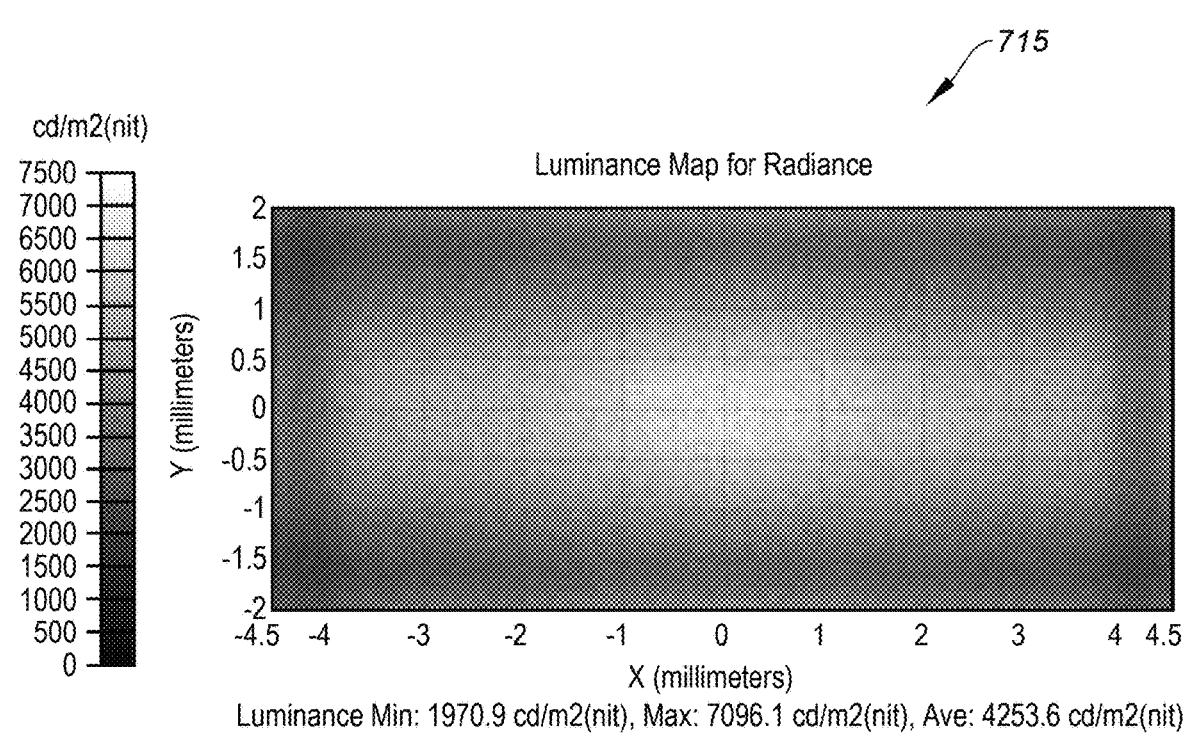
Figure 7C:
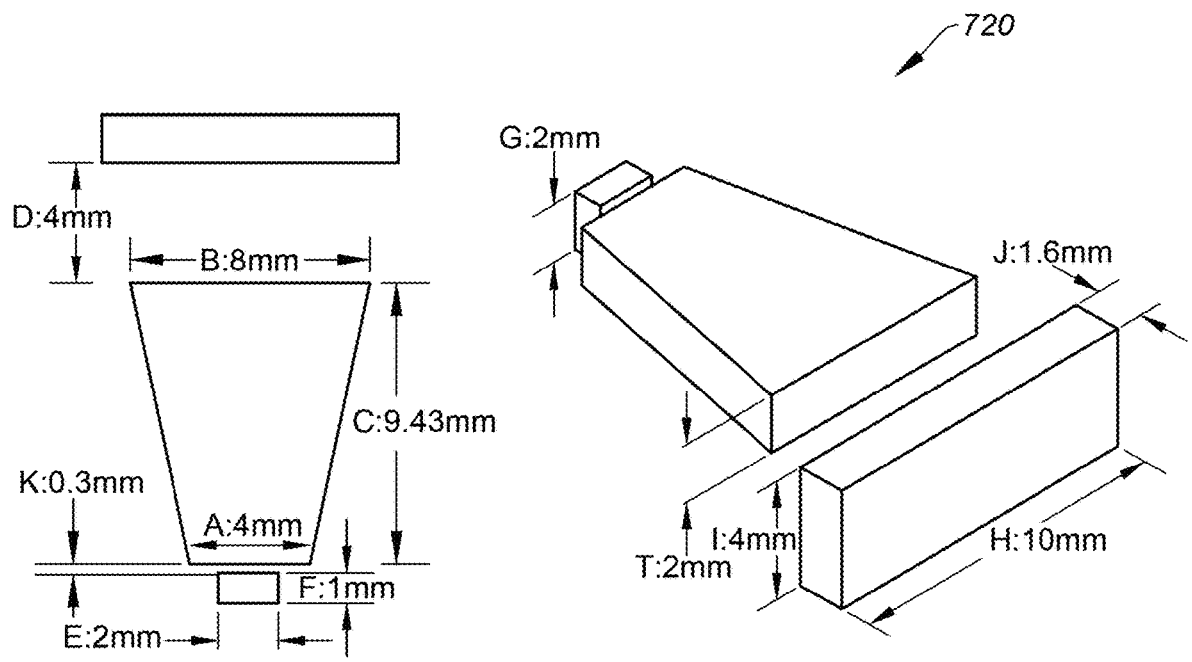
Figure 7C:
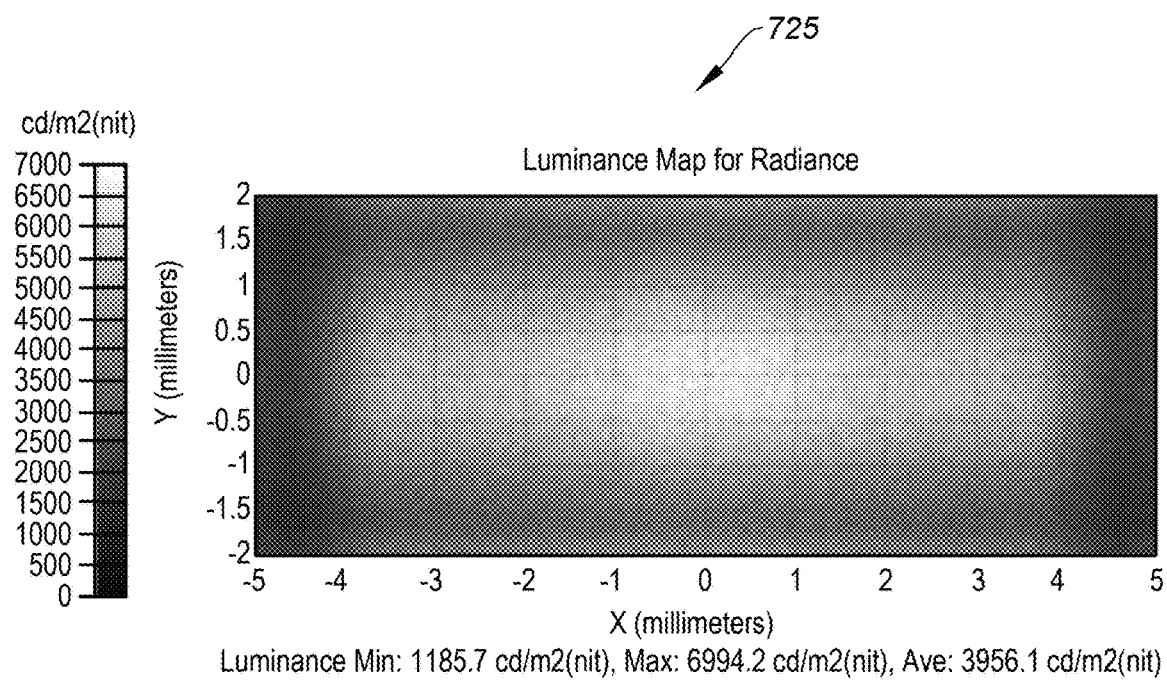

FIGS. 7A-7C show aspects of light guide system performance where the width of transparent region 425 is modified to deviate from the preferred dimensional relationship of H≤B, where the width of transparent region is not less than or equal to the width (B) of the top surface of light guide 430.

In FIG. 7A, light guide system 700, which has the same dimensional characteristics as light guide system 600, has exemplary illumination characteristics due in part to the light guide having a preferred H≤B ratio (e.g., H=8 mm; B=8 mm). As shown in Table 7 below, light guide system 700 has a relatively high average luminance (4495 nits) over the entire transparent region of 425, a uniformity of 57%, and luminance ratio of 1, which is visibly evident in the broad and uniform luminance pattern that is evenly distributed over most of transparent region 425, as depicted in graph 705 of FIG. 7A, as would be appreciated by one of ordinary skill in the art with the benefit of this disclosure.

TABLE 7

Dimensions and Illumination Characteristics for Light Guide System 700
Dimensions for Light Guide System 700 (H as variable; H <= B)

| System Element | Var | Description | Value | Distances/Illumination Char. | Value |
|---|---|---|---|---|---|
| Light Guide (LG) | A | Btm Width | 4 mm | Distance LED to LG (K): | 0.3 mm |
| | B | Top Width | 8 mm (2A) | | |
| | C | Height | 9.43 mm | Distance LG to TR (D): | 4 mm |
| | T | Depth | 2 mm | | |
| | | | | Avg. Luminance (nits): | 4495 |
| Light Emitting Element (LED) | E | Width | 2 mm | | |
| | F | Height | 1 mm | | |
| | G | Depth | 2 mm | | |
| | | | | Uniformity (1 × 1 mm): | 57% |
| Transparent Region (TR) | H | Width | 8 mm | | |
| | I | Depth | 4 mm | Luminance ratio: | 1 |
| | J | Height | 1.6 mm | | |

In FIG. 7B, light guide system 710 shows an example of a light guide that deviates from the preferred H≤B ratio, with non-preferred values of H=9 mm and B=8 mm (e.g., H>B), that is, the transparent region is larger than the output surface of the light guide, resulting in non-ideal lighting characteristics. As shown in Table 8 below, light guide system 710 has a low average luminance of 4231 nits over the entire transparent region 425, a low uniformity of 48%, and a luminance ratio of 0.94, as compared to the exemplary embodiment of FIG. 7A. These non-preferred illumination characteristics are visibly evident in graph 715 of FIG. 7B as a non-uniform illumination pattern, as would be appreciated by one of ordinary skill in the art with the benefit of this disclosure.

TABLE 8

Dimensions and Illumination Characteristics for Light Guide System 710
Dimensions for Light Guide System 710 (H as variable; H <= B)

| System Element | Var | Description | Value | Distances/Illumination Char. | Value |
|---|---|---|---|---|---|
| Light Guide (LG) | A | Btm Width | 4 mm | Distance LED to LG (K): | 0.3 mm |
| | B | Top Width | 8 mm (2A) | | |
| | C | Height | 9.43 mm | Distance LG to TR (D): | 4 mm |
| | T | Depth | 2 mm | | |
| | | | | Avg. Luminance (nits): | 4231 |
| Light Emitting Element (LED) | E | Width | 2 mm | | |
| | F | Height | 1 mm | | |
| | G | Depth | 2 mm | | |
| | | | | Uniformity (1 × 1 mm): | 48% |
| Transparent Region (TR) | H | Width | 9 mm | Luminance ratio: | 0.94 |
| | I | Depth | 4 mm | | |
| | J | Height | 1.6 mm | | |

In FIG. 7C, light guide system 720 shows an example of a light guide that deviates from the preferred H≤B ratio, with non-preferred values of H=10 mm and B=8 mm (e.g., H>B). As shown in Table 9 below, light guide system 720 has a low average luminance (3940 nits) over the entire transparent region 425, a low uniformity of 36%, and a low luminance ratio of 0.87, as compared to the exemplary embodiment of FIG. 7A. These non-preferred illumination characteristics are visibly evident in graph 725 of FIG. 7C as a non-uniform illumination pattern, as would be appreciated by one of ordinary skill in the art with the benefit of this disclosure.

TABLE 9

Dimensions and Illumination Characteristics for Light Guide System 720
Dimensions for Light Guide System 720 (H as variable; H <= B)

| System Element | Var | Description | Value | Distances/Illumination Char. | Value |
|---|---|---|---|---|---|
| Light Guide (LG) | A | Btm Width | 4 mm | Distance LED to LG (K): | 0.3 mm |
| | B | Top Width | 8 mm (2A) | | |
| | C | Height | 9.43 mm | Distance LG to TR (D): | 4 mm |
| | T | Depth | 2 mm | | |
| | | | | Avg. Luminance (nits): | 3940 |
| Light Emitting Element (LED) | E | Width | 2 mm | | |
| | F | Height | 1 mm | | |
| | G | Depth | 2 mm | | |
| | | | | Uniformity (1 × 1 mm): | 36% |
| Transparent Region (TR) | H | Width | 10 mm | Luminance ratio: | 0.87 |
| | I | Depth | 4 mm | | |
| | J | Height | 1.6 mm | | |

FIGS. 8A-8E show aspects of light guide system performance when the depth (thickness) of transparent region 425 is modified to deviate from the preferred dimensional relationship of I≤T+2 mm, where the depth of transparent region is less than or equal to the depth (T) of the light guide plus 2 mm.

Light guide 800, which has the same dimensional characteristics as light guide system 600, has exemplary illumination characteristics due in part to the light guide having a preferred I≤T+2 mm ratio (e.g., 1=4 mm, T=2 mm). As shown in Table 10 below, light guide system 800 has a relatively high average luminance (4495 nits) over the entire transparent region of 425, a uniformity of 57%, and luminance ratio of 1, which is visibly evident in the broad and uniform luminance pattern that is evenly distributed over most of transparent region 425, as depicted in graph 805 of FIG. 8A.

TABLE 10

Dimensions and Illumination Characteristics for Light Guide System 800
Dimensions for Light Guide System 800
(Different Transparent Area (I and T);
I <= T + 2 mm; 1 <= T <= 3.5 mm)

| System Element | Var | Description | Value | Distances/Illumination Char. | Value |
|---|---|---|---|---|---|
| Light Guide (LG) | A | Btm Width | 4 mm | Distance LED to LG (K): | 0.3 mm |
|  | B | Top Width | 8 mm (2A) |  |  |
|  | C | Height | 9.43 mm | Distance LG to TR (D): | 4 mm |
|  | T | Depth | 2 mm |  |  |
|  |  |  |  | Avg. Luminance (nits): | 4495 |
| Light Emitting Element (LED) | E | Width | 2 mm |  |  |
|  | F | Height | 1 mm |  |  |
|  | G | Depth | 2 mm |  |  |
|  |  |  |  | Uniformity (1 × 1 mm): | 57% |
| Transparent Region (TR) | H | Width | 8 mm |  |  |
|  | I | Depth | 4 mm | Luminance ratio: | 1 |
|  | J | Height | 1.6 mm |  |  |

Figure 8A:
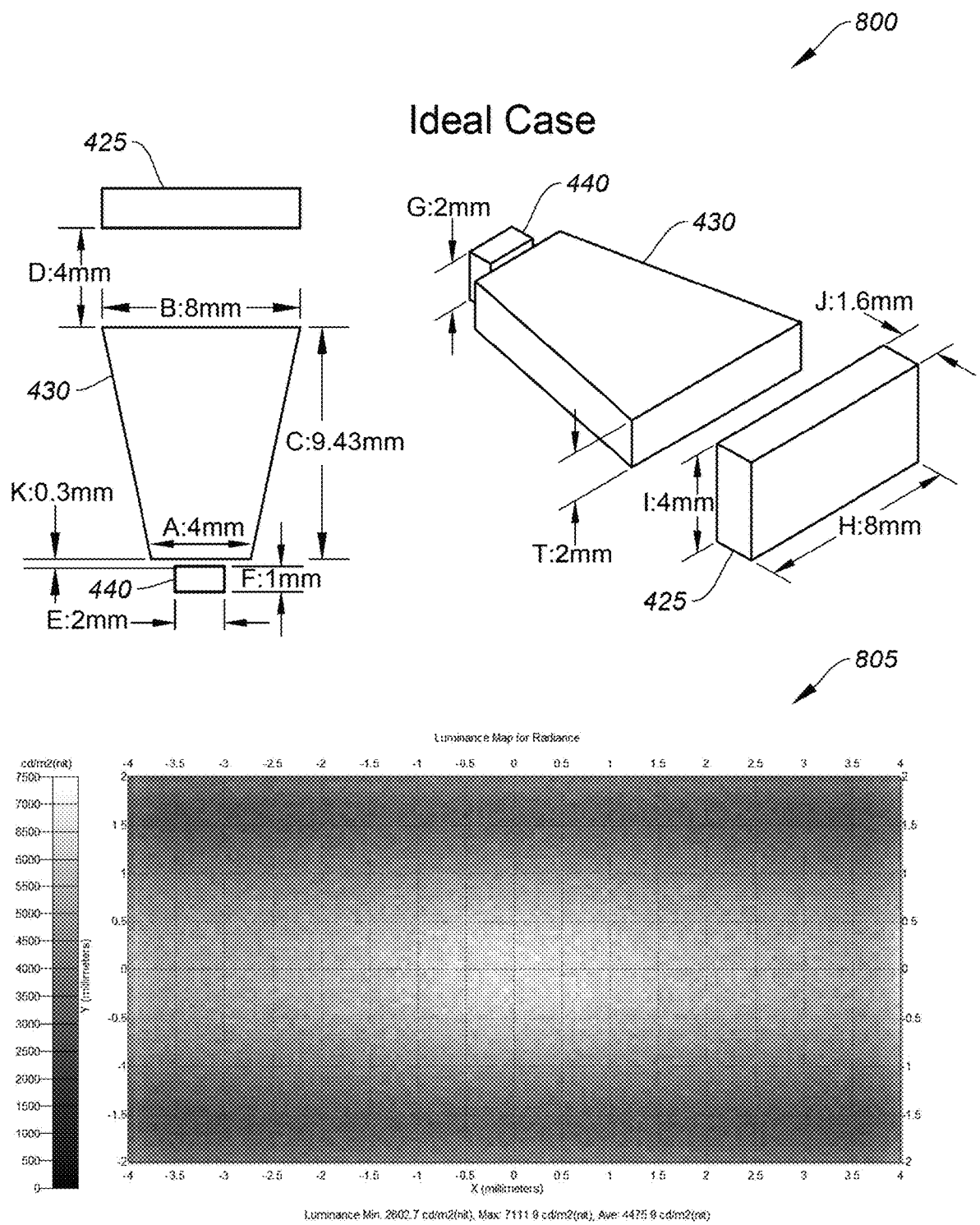
FIG. 8A shows an exemplary embodiment of a light guide and key cap with a different lighting area along a second dimension with corresponding performance characteristics, according to certain embodiments.
Figure 8B:
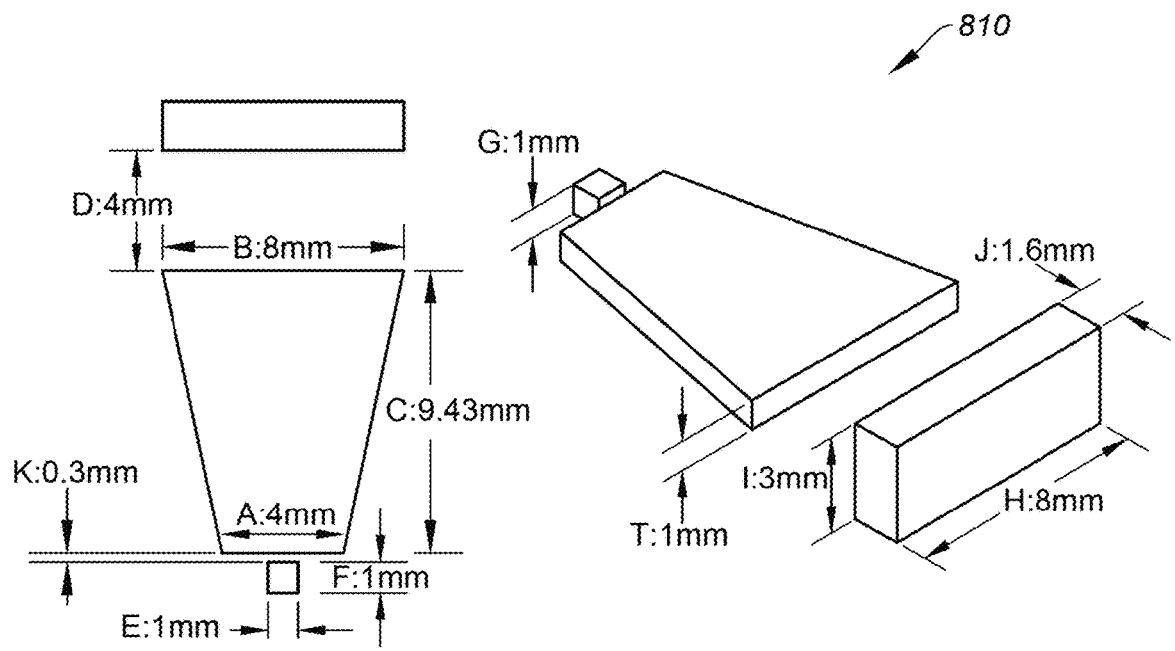
FIGS. 8B-8E show light guides having different dimensions with the different lighting area along the second dimension and their corresponding performance characteristics.
Figure 8B:
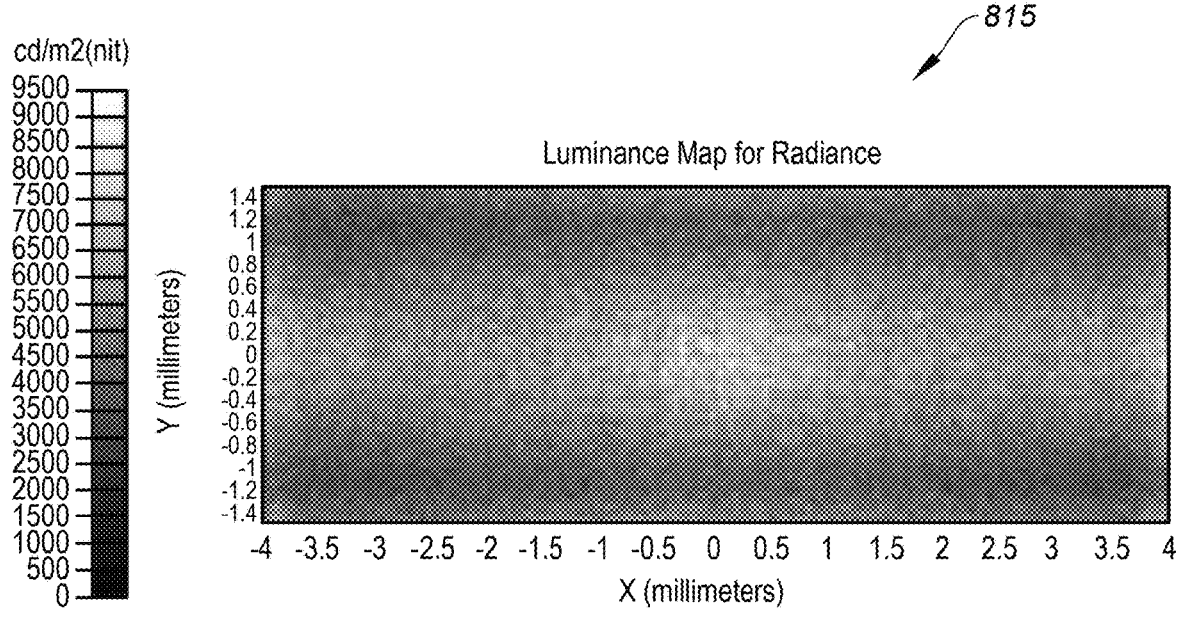

In FIG. 8B, light guide system 810 shows an example of a light guide that maintains the preferred I≤T+2 mm ratio, but with different values of I=3 mm and T=1 mm. As shown in Table 11 below, light guide system 810 has a luminance of 5145 nits, a uniformity of 62%, and a luminance ratio of 1.14. Although the illumination characteristics are good in both average luminance and uniformity due to the adherence to the preferred ranges described above, the coverage over transparent region is more narrow, as can be seen in graph 815 of FIG. 8B.

TABLE 11

Dimensions and Illumination Characteristics for Light Guide System 810
Dimensions for Light Guide System 810
(Different Transparent Area (I and T);
I <= T + 2 mm; 1 <= T <= 3.5 mm)

| System Element | Var | Description | Value | Distances/Illumination Char. | Value |
|---|---|---|---|---|---|
| Light Guide (LG) | A | Btm Width | 4 mm | Distance LED to LG (K): | 0.3 mm |
|  | B | Top Width | 8 mm (2A) |  |  |
|  | C | Height | 9.43 mm | Distance LG to TR (D): | 4 mm |
|  | T | Depth | 1 mm |  |  |
|  |  |  |  | Avg. Luminance (nits): | 5145 |
| Light Emitting Element (LED) | E | Width | 1 mm |  |  |
|  | F | Height | 1 mm |  |  |
|  | G | Depth | 1 mm |  |  |
|  |  |  |  | Uniformity (1 × 1 mm): | 62% |
| Transparent Region (TR) | H | Width | 8 mm |  |  |
|  | I | Depth | 3 mm | Luminance ratio: | 1.14 |
|  | J | Height | 1.6 mm |  |  |

Figure 8C:
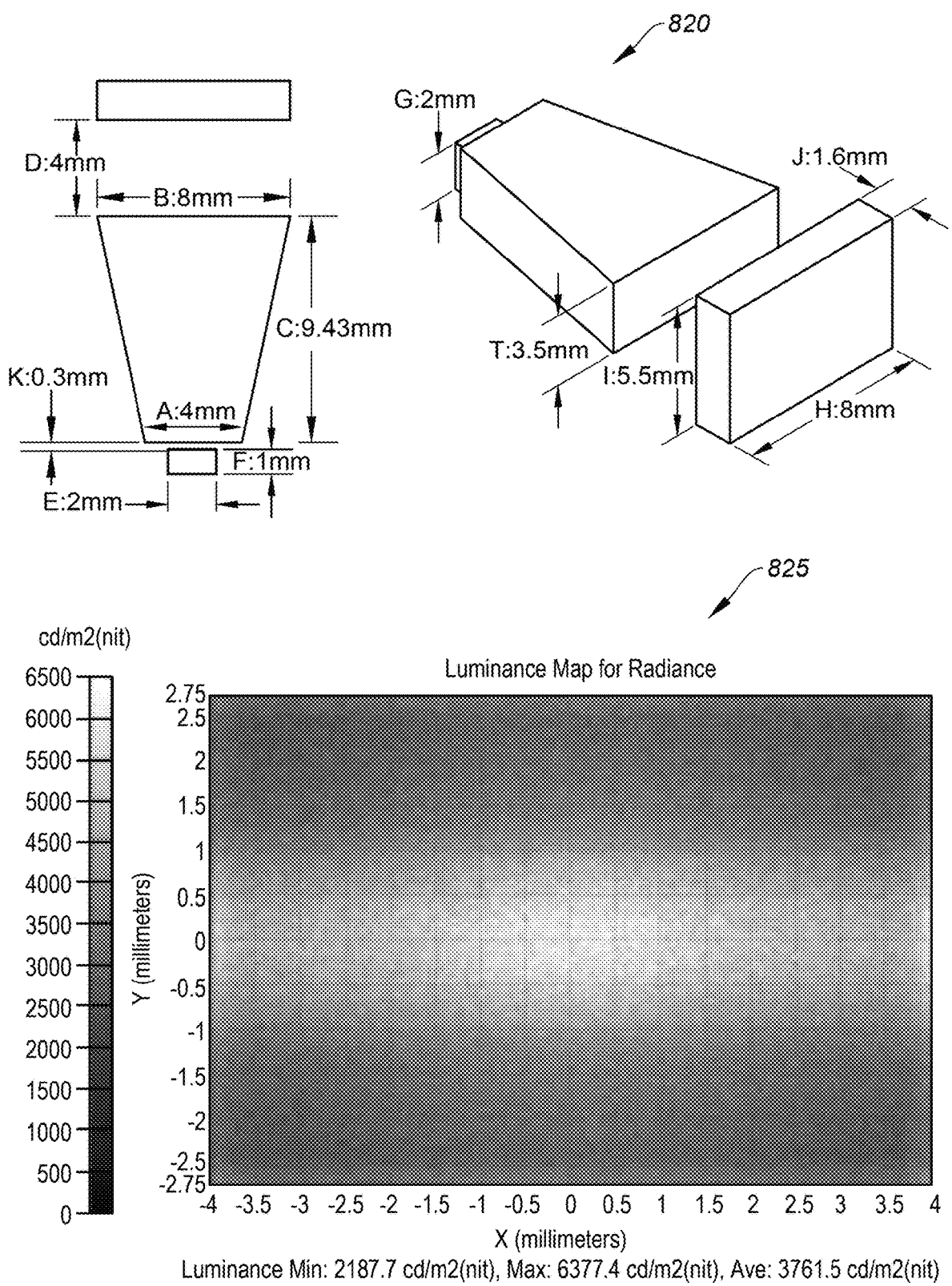

In FIG. 8C, light guide system 820 shows an example of a light guide that maintains the preferred I≤T+2 mm ratio, again with different values of I=5.5 mm and T=3.5 mm. As shown in Table 12 below, light guide system 820 has a relatively low luminance of 3844 nits, a uniformity of 56%, and a luminance ratio of 0.85. Although the recommended ratios are maintained, the illumination characteristics are not as good as light guide system 800, and the coverage over transparent region is wider, as can be seen in chart 825 of FIG. 8C.

TABLE 12

Dimensions and Illumination Characteristics for Light Guide System 820
Dimensions for Light Guide System 820
(Different Transparent Area (I and T);
I <= T + 2 mm; 1 <= T <= 3.5 mm)

| System Element | Var | Description | Value | Distances/Illumination Char. | Value |
|---|---|---|---|---|---|
| Light Guide (LG) | A | Btm Width | 4 mm | Distance LED to LG (K): | 0.3 mm |
|  | B | Top Width | 8 mm (2A) |  |  |
|  | C | Height | 9.43 mm | Distance LG to TR (D): | 4 mm |
|  | T | Depth | 3.5 mm |  |  |
|  |  |  |  | Avg. Luminance (nits): | 3844 |
| Light Emitting Element (LED) | E | Width | 2 mm |  |  |
|  | F | Height | 1 mm |  |  |
|  | G | Depth | 2 mm |  |  |
|  |  |  |  | Uniformity (1 × 1 mm): | 56% |
| Transparent Region (TR) | H | Width | 8 mm |  |  |
|  | I | Depth/ | 5.5 mm | Luminance ratio: | 0.85 |
|  | J | Height | 1.6 mm |  |  |

Figure 8D:
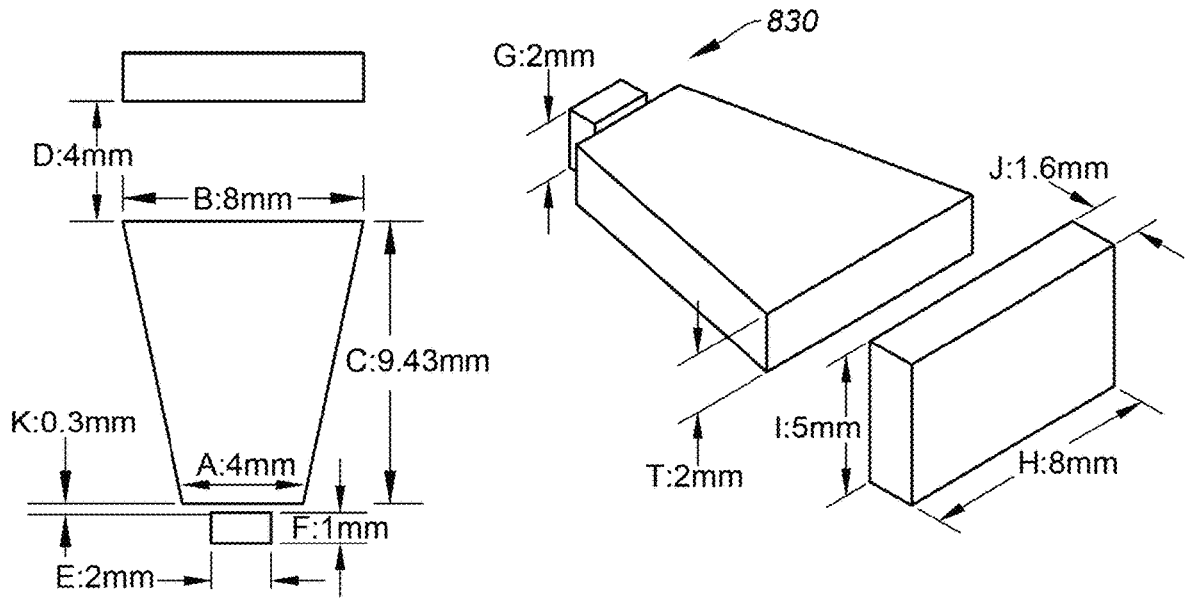
Figure 8D:
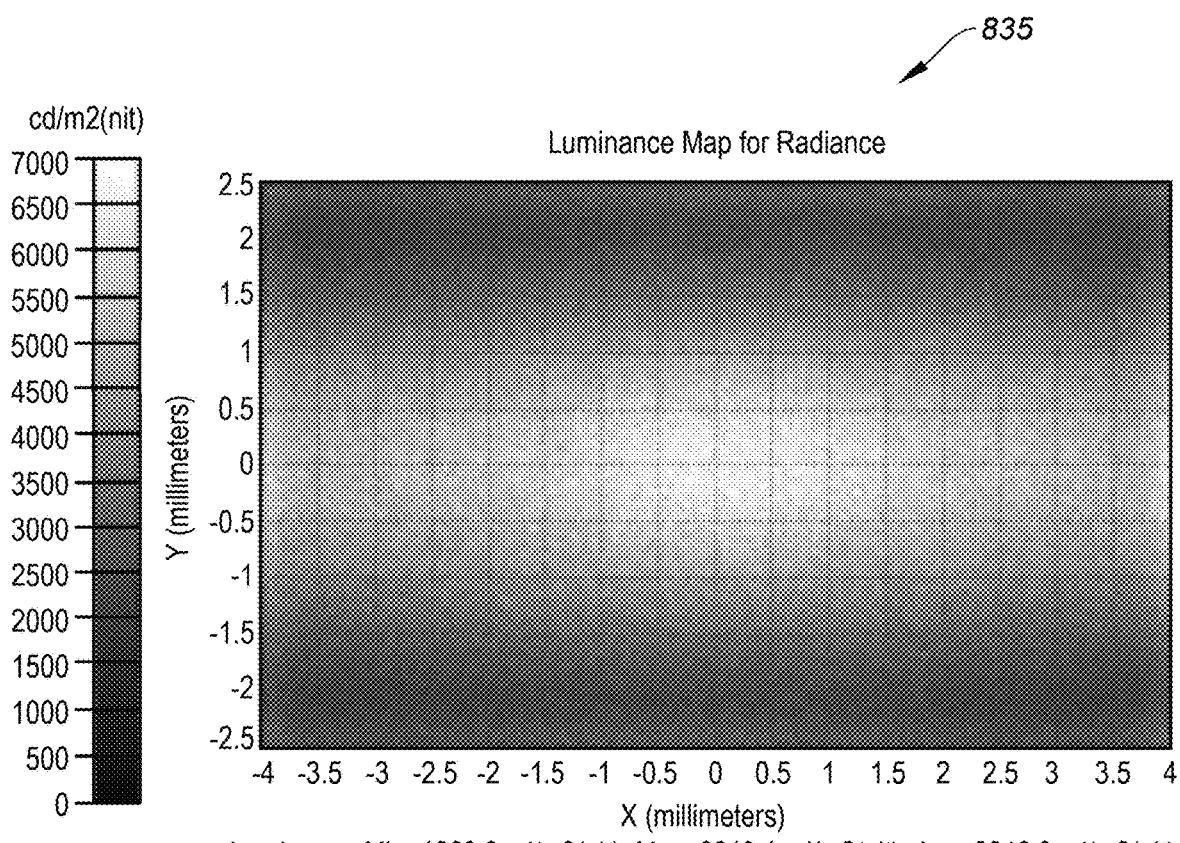

In FIG. 8D, light guide system 830 shows an example of a light guide that deviates from the preferred I≤T+2 mm ratio, with values of I=5 mm and T=2 mm. As shown in Table 13 below, light guide system 830 has a luminance of 3896 nits, a uniformity of 46%, and a luminance ratio of 0.86. Referring to chart 835 of FIG. 8D, the illumination is very bright in the center and less bright moving laterally. The top and bottom edges are dark due in part to the transparent region having more depth than the light guide.

TABLE 13

Dimensions and Illumination Characteristics for Light Guide System 830
Dimensions for Light Guide System 830
(Different Transparent Area (I and T);
I <= T + 2 mm; 1 <= T <= 3.5 mm)

| System Element | Var | Description | Value | Distances/Illumination Char. | Value |
|---|---|---|---|---|---|
| Light Guide (LG) | A | Btm Width | 4 mm | Distance LED to LG (K): | 0.3 mm |
|  | B | Top Width | 8 mm (2A) |  |  |
|  | C | Height | 9.43 mm | Distance LG to TR (D): | 4 mm |
|  | T | Depth | 2 mm |  |  |
|  |  |  |  | Avg. Luminance (nits): | 3896 |
| Light Emitting Element (LED) | E | Width | 2 mm |  |  |
|  | F | Height | 1 mm |  |  |
|  | G | Depth | 2 mm |  |  |
|  |  |  |  | Uniformity (1 × 1 mm): | 46% |
| Transparent Region (TR) | H | Width | 8 mm |  |  |
|  | I | Depth | 5 mm | Luminance ratio: | 0.86 |
|  | J | Height | 1.6 mm |  |  |

Figure 8E:
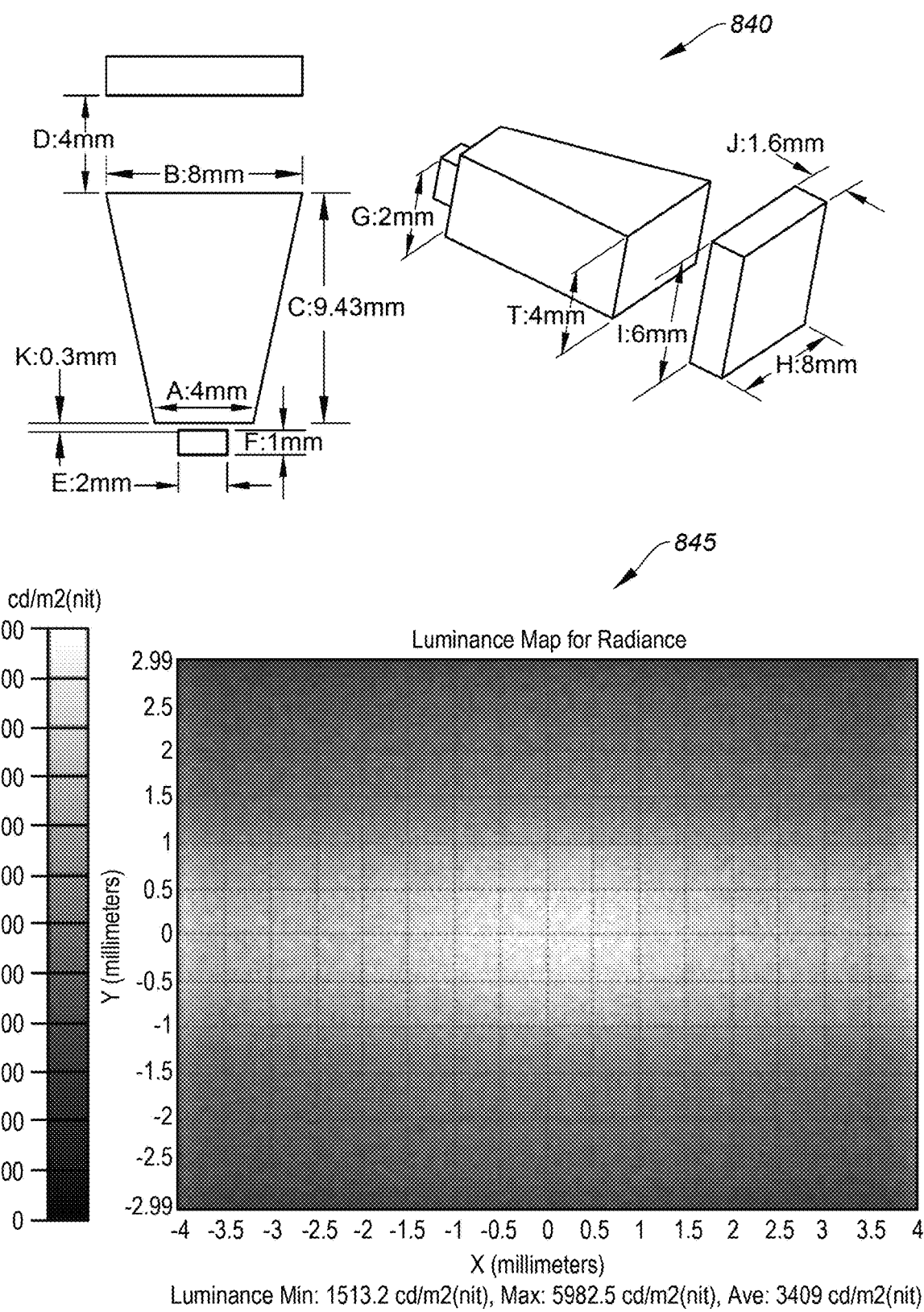

In FIG. 8E, light guide system 840 shows an example of a light guide that deviates from the preferred I≤T+2 mm ratio, with values of I=6 mm and T=4 mm. As shown in Table 14 below, light guide system 840 has a luminance of 3478 nits, a uniformity of 52%, and a luminance ratio of 0.77. The uniformity of light guide 840 is higher than light guide 830, but the average luminance is lower. Referring to chart 845 of FIG. 8E, the illumination is very bright in the center and less bright moving laterally. The top and bottom edges are dark due in part to the transparent region having more depth than the light guide.

TABLE 14

Dimensions and Illumination Characteristics for Light Guide System 840
Dimensions for Light Guide System 840
(Different Transparent Area (I and T);
I <= T + 2 mm; 1 <= T <= 3.5 mm)

| System Element | Var | Description | Value | Distances/Illumination Char. | Value |
|---|---|---|---|---|---|
| Light Guide (LG) | A | Btm Width | 4 mm | Distance LED to LG (K): | 0.3 mm |
| | B | Top Width | 8 mm (2A) | | |
| | C | Height | 9.43 mm | Distance LG to TR (D): | 4 mm |
| | T | Depth | 4 mm | | |
| | | | | Avg. Luminance (nits): | 3478 |
| Light Emitting Element (LED) | E | Width | 2 mm | | |
| | F | Height | 1 mm | | |
| | G | Depth | 2 mm | | |
| | | | | Uniformity (1 × 1 mm): | 52% |
| Transparent Region (TR) | H | Width | 8 mm | | |
| | I | Depth | 6 mm | Luminance ratio: | 0.77 |
| | J | Height | 1.6 mm | | |

Figure 9A:
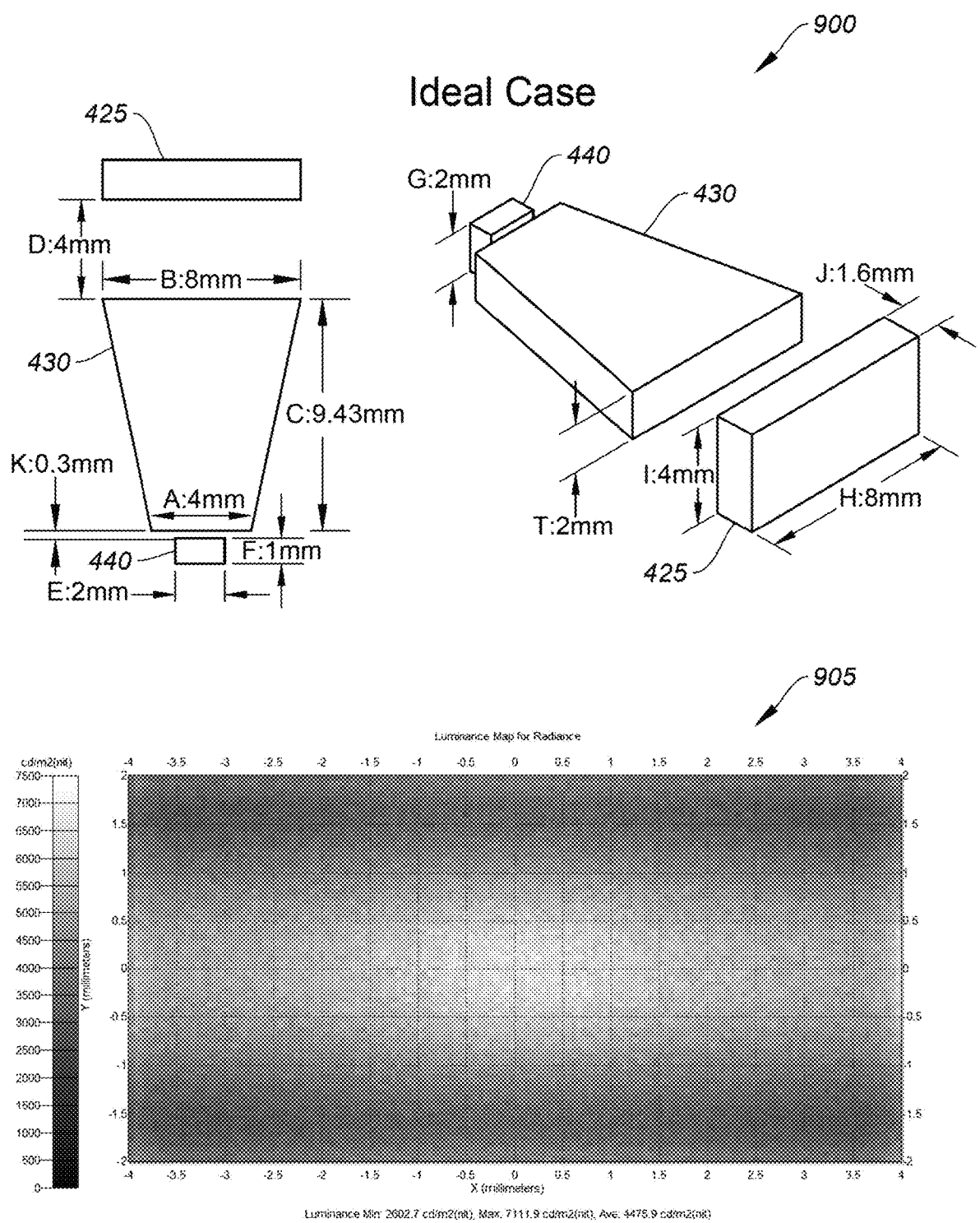
FIG. 9A shows an exemplary embodiment of a light guide and key cap with a different lighting area along a third dimension with corresponding performance characteristics, according to certain embodiments.
Figure 9B:
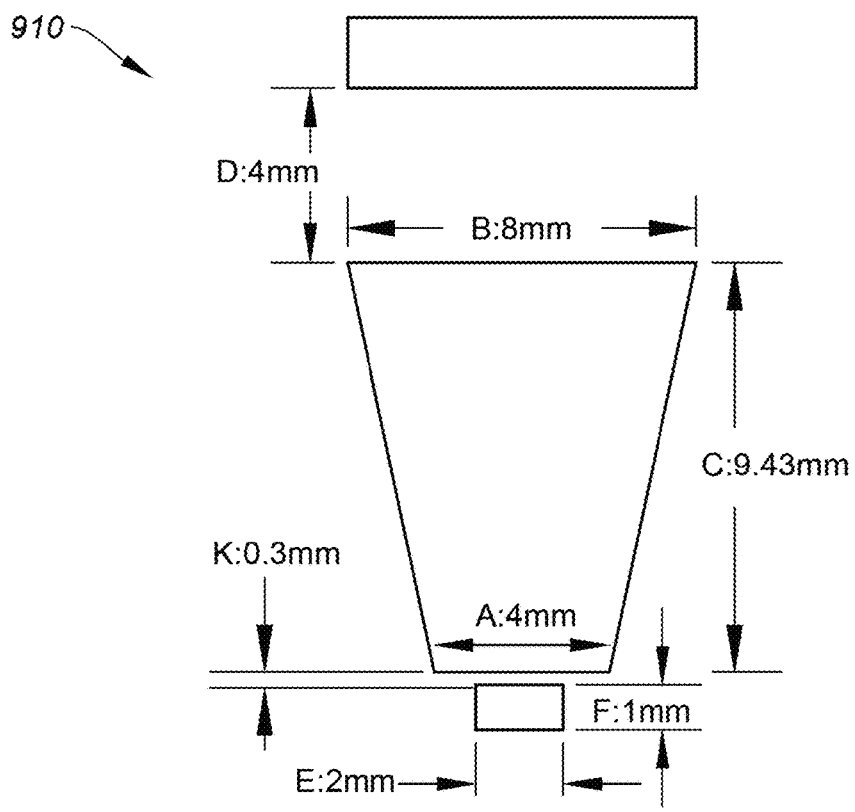
FIGS. 9B-9C show light guides having different dimensions with the different lighting area along the third dimension and their corresponding performance characteristics.
Figure 9B:
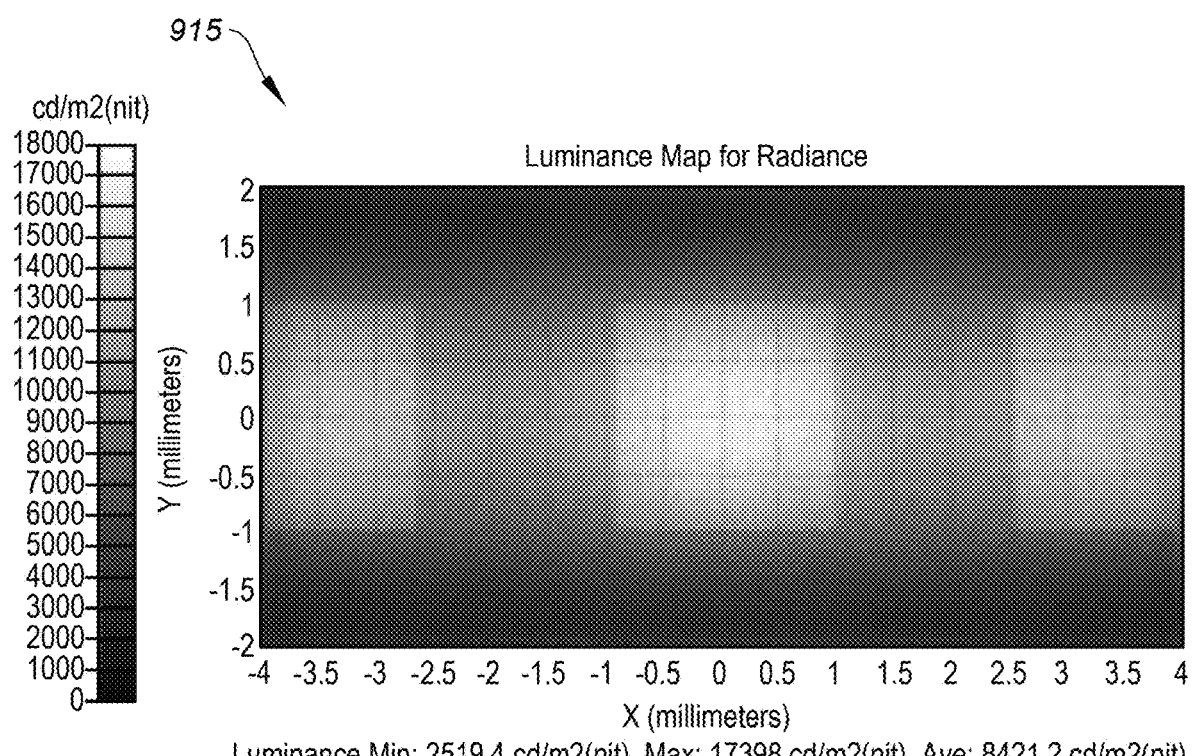
Figure 9C:
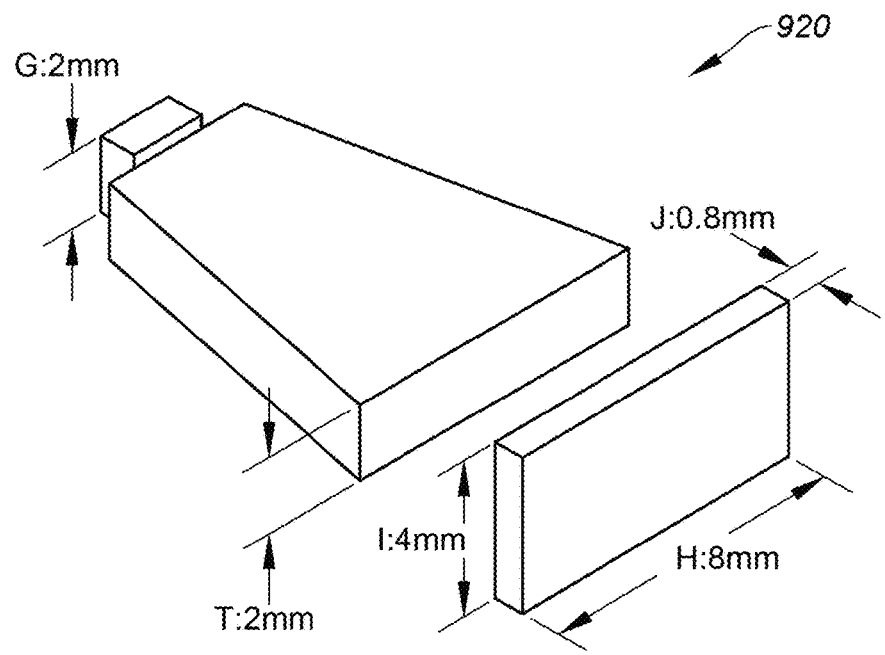
Figure 9C:
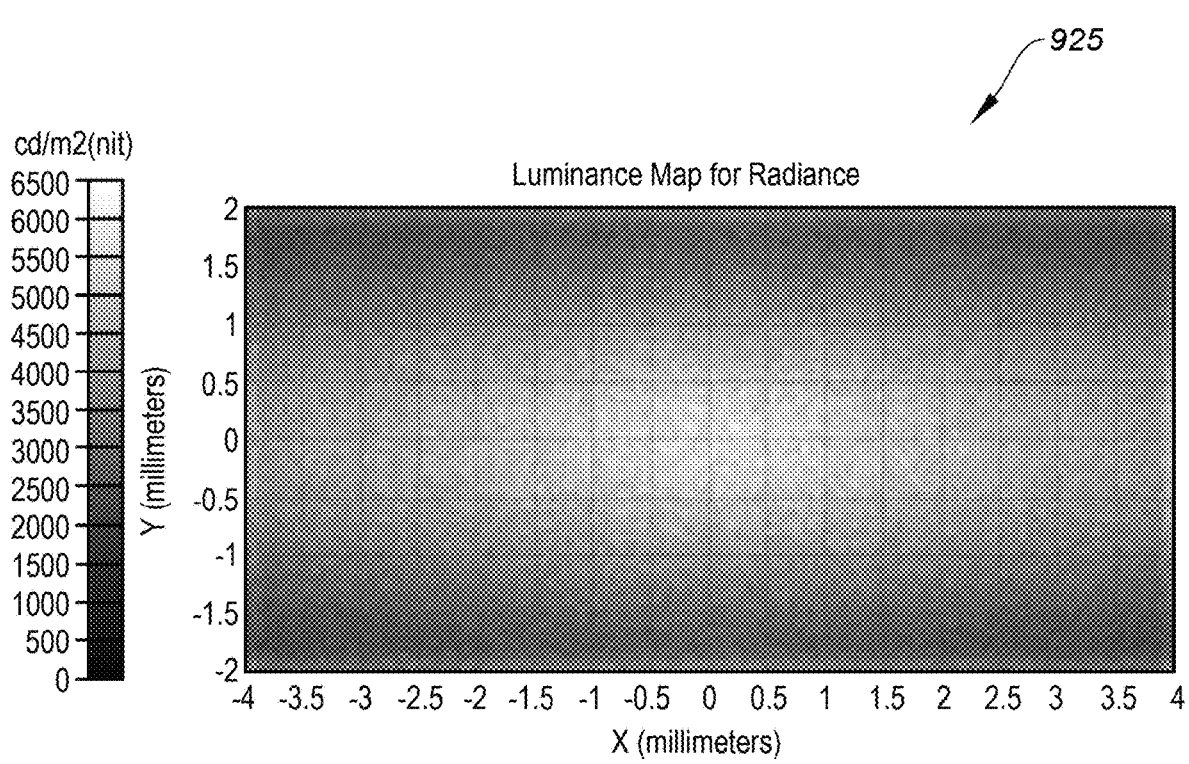

FIGS. 9A-9C show aspects of light guide system performance when the height of transparent region 425 is modified to deviate from the preferred dimensional relationship of J 0.8 mm.

Light guide 900, which has the same dimensional characteristics as light guide system 600, has exemplary illumination characteristics due in part to the light guide having a preferred J≥0.8 mm ratio (e.g., J=1.6 mm) and an $SiO_2$ content of 0.3% (exemplary value). As shown in Table 15 below, light guide system 900 has a relatively high average luminance 4495 over the entire transparent region of 425, a uniformity of 57%, and a luminance ratio of 1, which is visibly evident in the broad and uniform luminance pattern that is evenly distributed over most of transparent region 425, as depicted in graph 905 of FIG. 9A. $SiO_2$ is a diffuser material that can be used to help achieve better luminance uniformity; however, certain values of $SiO_2$ content that deviates from 0.3% may cause a decrease average luminance. Balancing between average luminance and uniformity with diffuser content should be considered, as would be appreciated by one of ordinary skill in the art with the benefit of this disclosure.

It should be understood that the transparent region may be less than transparent (e.g., semi-transparent) due to the diffuser ($SiO_2$) content. A diffuser may be added to scatter the light when illuminated and may add a visibly "milky" effect. Further, in reference to the figures (e.g., FIGS. 6A-9C) that show luminance patterns, it should be understood luminance is not normalized on the luminance pattern, and the scale of each luminance pattern can be different with each figure. As such, uniformity can refer to the luminance patterns, but the average luminance should be referenced to the calculated number in the corresponding Tables.

TABLE 15

Dimensions and Illumination Characteristics for Light Guide System 900
Dimensions for Light Guide System 900
(Different Transparent Area (J);
J >= 0.8 mm/$SiO_2$ 0.3%)

| System Element | Var | Description | Value | Distances/Illumination Char. | Value |
|---|---|---|---|---|---|
| Light Guide (LG) | A | Btm Width | 4 mm | Distance LED to LG (K): | 0.3 mm |
| | B | Top Width | 8 mm (2A) | | |
| | C | Height | 9.43 mm | Distance LG to TR (D): | 4 mm |
| | T | Depth | 2 mm | | |
| | | | | Avg. Luminance (nits): | 4495 |
| Light Emitting Element (LED) | E | Width | 2 mm | | |
| | F | Height | 1 mm | | |
| | G | Depth | 2 mm | | |
| | | | | Uniformity (1 × 1 mm): | 57% |
| Transparent Region (TR) | H | Width | 8 mm | | |
| | I | Depth | 4 mm | Luminance ratio: | 1 |
| | J | Height | 1.6 mm | | |

In FIG. 9B, light guide system 910 shows an example of a light guide that borders on the preferred J≥0.8 mm ratio, with J=0.8 mm, and a $SiO_2$ content of 0.3%. As shown in Table 16 below, light guide system 910 has a luminance of 8665 nits, a uniformity of 29%, and a luminance ratio of 1.93.

TABLE 16

Dimensions and Illumination Characteristics for Light Guide System 910
Dimensions for Light Guide System 910
(Different Transparent Area (J);
J >= 0.8 mm/SiO$_2$ 0.3%)

| System Element | Var | Description | Value | Distances/Illumination Char. | Value |
|---|---|---|---|---|---|
| Light Guide (LG) | A | Btm Width | 4 mm | Distance LED to LG (K): | 0.3 mm |
|  | B | Top Width | 8 mm (2A) |  |  |
|  | C | Height | 9.43 mm | Distance LG to TR (D): | 4 mm |
|  | T | Depth | 2 mm |  |  |
|  |  |  |  | Avg. Luminance (nits): | 8665 |
| Light Emitting Element (LED) | E | Width | 2 mm |  |  |
|  | F | Height | 1 mm |  |  |
|  | G | Depth | 2 mm |  |  |
|  |  |  |  | Uniformity (1 × 1 mm): | 29% |
| Transparent Region (TR) | H | Width | 8 mm |  |  |
|  | I | Depth | 4 mm | Luminance ratio: | 1.93 |
|  | J | Height | 0.8 mm |  |  |

In FIG. 9C, light guide system 920 shows an example of a light guide that maintains the preferred I≤T+2 mm ratio. As shown in Table 17 below, light guide system 920 has a luminance of 3866 nits, a uniformity of 55%, and a luminance ratio of 0.86.

TABLE 17

Dimensions and Illumination Characteristics for Light Guide System 920
Dimensions for Light Guide System 920
(Different Transparent Area (J);
J >= 0.8 mm/SiO$_2$ 0.7%)

| System Element | Var | Description | Value | Distances/Illumination Char. | Value |
|---|---|---|---|---|---|
| Light Guide (LG) | A | Btm Width | 4 mm | Distance LED to LG (K): | 0.3 mm |
|  | B | Top Width | 8 mm (2A) |  |  |
|  | C | Height | 9.43 mm | Distance LG to TR (D): | 4 mm |
|  | T | Depth | 2 mm |  |  |
|  |  |  |  | Avg. Luminance (nits): | 3866 |
| Light Emitting Element (LED) | E | Width | 2 mm |  |  |
|  | F | Height | 1 mm |  |  |
|  | G | Depth | 2 mm |  |  |
|  |  |  |  | Uniformity (1 × 1 mm): | 55% |
| Transparent Region (TR) | H | Width | 8 mm |  |  |
|  | I | Depth | 4 mm | Luminance ratio: | 0.86 |
|  | J | Height | 0.8 mm |  |  |

The key mechanism of other embodiments of the present disclosure will be described below with reference to FIGS. 10-12.

Figure 10:
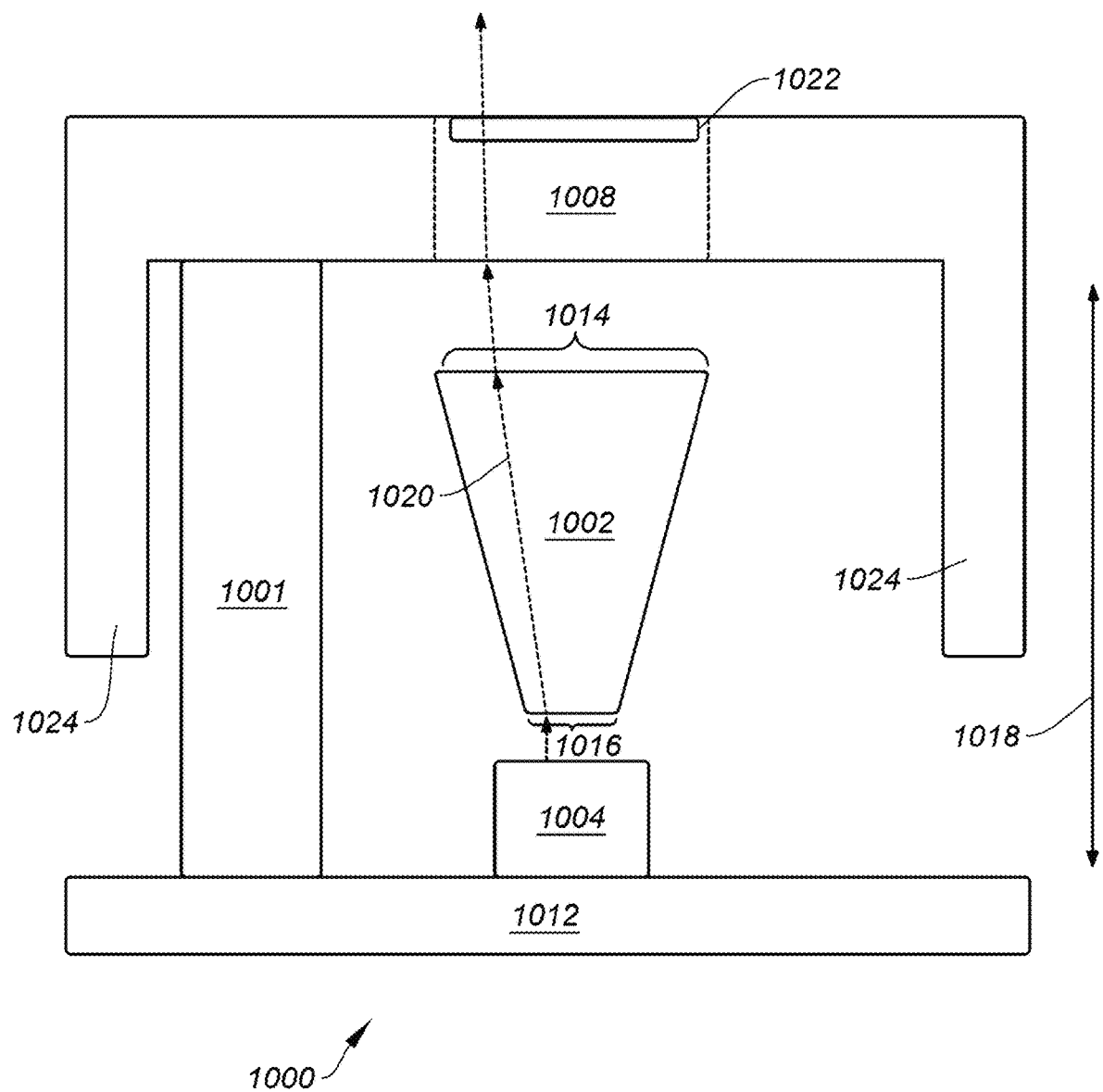
FIG. 10 illustrates a mechanism for use in an illuminated keyboard, according to certain embodiments.

FIG. 10 illustrates an example mechanism 1000 of an illuminated keyboard key. Illustrated is a keycap 1024 with an illuminated portion 1008. A rebound mechanism 1001 couples keycap 1024 to an underlying substrate 1012. Rebound mechanism 1001 can be a butterfly, mechanical, or dome switch mechanism that can be used to provide a return force to keycap 1024 after it is depressed by a user of the illuminated keyboard key. In other words, keycap 1024 can move relative to substrate 1012 in direction of arrow 1018.

Light pipe 1002 can be used to optically couple light source 1004 to illuminated portion 1008 of keycap 1024 to provide an optical path there between. Light source 1004 can be an LED of any configuration (such as a through-hole or surface mount device (SMD) LED). Light source 1004 may be mounted on substrate 1012 or elsewhere. In certain embodiments, light source 1004 can be a multicolor light source that can include multiplied LEDs, each of a differing base color whose proportions can be altered to change an overall light color emitted by light source 1004. Light source 1004 may be an organic LED or other light emitting devices that convert electrical energy to light energy.

Illuminated portion 1008 can include one or more surface features 1022 that can be viewable by a user of an illuminated keyboard using mechanism 1000. Surface features 1022 can include alphanumeric symbols, phrases (e.g., Delete, Home, PgUp), operating system specific symbols (e.g., a Windows or Mac key), Chinese character(s), system functions (volume up, down), etc. The symbols can be illuminated to allow a user of a keyboard to more easily determine the function of a key to process. This can be useful, for example, if the keyboard is in a dark environment where non-illuminated symbols may not be visible to the user. The illumination can be in a monotone color or can be multicolored. In other words, the color for each key can be changed over time using combinations of different colored light sources that illuminate light pipe 1002 and illuminated portion 1008. Parts of illuminated portion 1008 and/or surface features 1022 can be transparent to allow light passing through and reach the eye of a user of a keyboard including mechanism 1000.

A notional light path is illustrated by arrow 1020 which is generated by light source 1004 and respectively passes through light pipe 1002 and transparent parts of illuminated portion 1008 of keycap 1024 to ultimately be viewed by a user (not shown). Additionally, the light path represented by arrow 1020 can illuminate surface features 1022 that can include transparent parts as disclosed herein.

Keycap can include one or more sidewalls to shield and protect internal portions of mechanism 1000 from view of a user and prevent foreign particles from entering the internal portions. For example, rebound mechanism 1001 and light pipe 1002 may both be located within a cavity defined by keycap 1006 and the sidewalls. The limitations of the physical space within this cavity can present challenges to the design of light pipe 1002 and rebound mechanism 1001. For example and as disclosed herein, rebound mechanism 1001 may be a mechanical rebound mechanism including a physical spring to provide a rebound force to keycap 124. The size and location of rebound mechanism 1001 may need to be taken into account when designing light pipe 1002 to balance the light pipe's efficiency and a lighting uniformity of illuminated portion 1008. For example, lighting uniformity may be improved by designing light pipe 1002 such that an end 1014 distal to light source 1004 is approximately twice as long as an end 1016 proximate to light source 1004. These features aid in distributing light emitted by light source 1004 as illustrated by arrow 1020 which shows one such notional path of a light beam being refracted by light pipe 1002.

Figure 11:
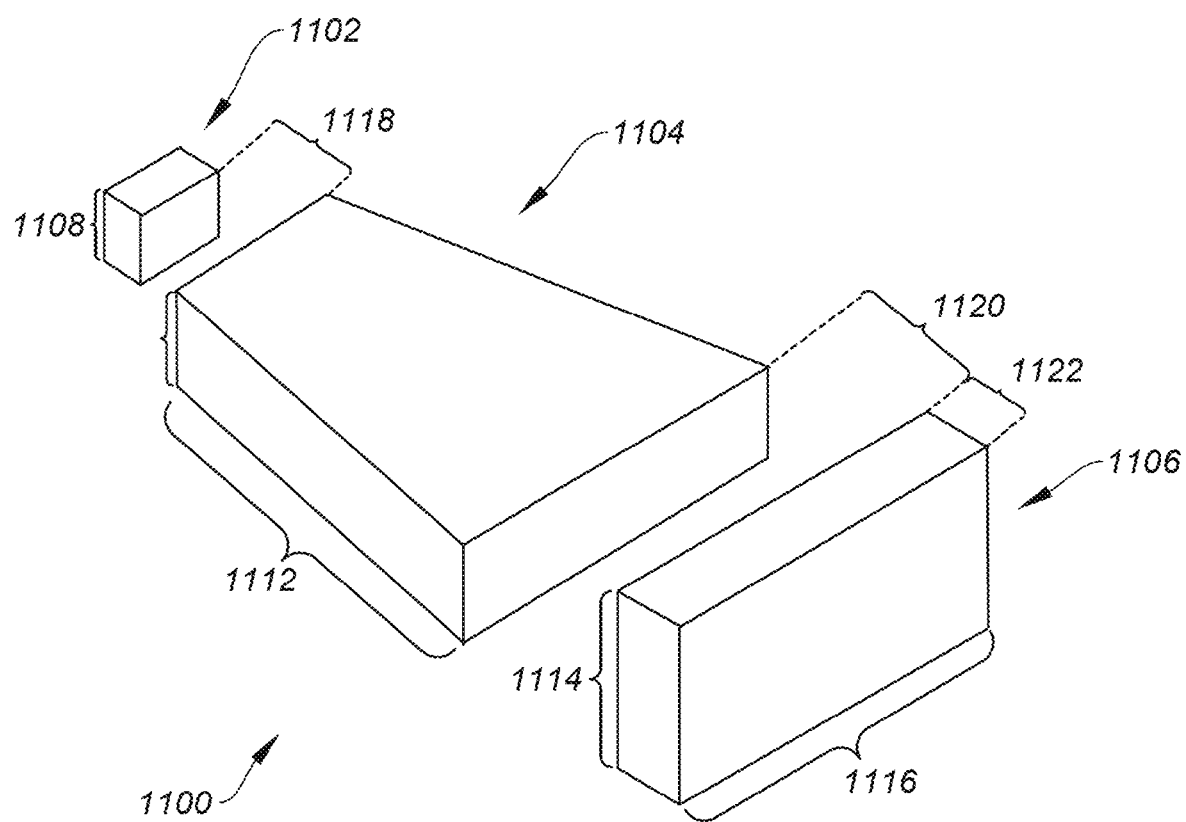
FIG. 11 illustrates dimensions of a light pipe system according to certain techniques of the disclosure that can be used in the mechanism of FIG. 10.

FIG. 11 illustrates features of the disclosure regarding physical dimensions of light pipe 1002 and its location in relation to light source 1004 and/or illuminated portion 1008 to balance light pipe's efficiency and a lighting uniformity of illuminated portion 1008. Illustrated is mechanism 1100 including light pipe 1104 which may be similar to light pipe 1002, light source 1102 which may be similar to light source 1004, and illuminated portion 1106 which may be similar to illuminated portion 1008.

As disclosed herein, features of light pipe 1104 must be carefully balanced to provide an optimal illumination uniformity for illuminated portion 1106, efficiency in light transmitted from light source 1102 to illuminated portion 1106, and to fall within physical constraints of cavities defined by keyboard keycaps (such as keycap 124). Illustrated are several dimensions found to optimize these aspects of light pipe 1104 (in addition to a distal end by approximately twice as long as a proximate end as described with regards to FIG. 10). As illustrated, a length 1112 of light pipe 1104 between the proximate and distal ends can be greater than or equal to five millimeters.

As illustrated, light pipe 1104 can take the shape of a trapezoidal prism (including an isosceles trapezoidal prism) and can have a relatively uniform thickness to aid in packaging alongside a rebound mechanism (such as rebound mechanism 1001) and/or to aid in illumination uniformity of illuminated portion 1106. The thickness of light pipe 1104 can be between one and three and a half millimeters. A distance 1120 between light pipe 1104 and illuminated portion 1106 can be greater than or equal to four millimeters in a resting position (e.g., wherein a rebound mechanism coupled to a keycap including illuminated portion 1106 is not currently depressed by a user, as described with regards to FIG. 10).

A refractive index of a material used for light pipe 204 can range from 1.30 to 1.70. For example, the following materials may be used wherein the approximate refractive index is represented by n:

Plastic:
Acrylonitrile butadiene styrene (ABS), n=1.534
Polycarbonates (PC), n=1.496
Polymethyl methacrylate (PMMA), n=1.493
Polystyrene (PS), n=1.596
Polypropylene (PP), n=1.492
Glass, n=1.50~1.65
Silicone rubber, n=1.40~1.60

Light source 1102 can have a thickness 1108 that is less than or equal to thickness of light pipe 1104. A distance 1118 between light source 1102 and light pipe 1104 can be between zero and three tenths of a millimeter.

Illuminated portion 1106 can have a thickness equal to the thickness of light pipe 1104 plus two millimeters. Illuminated portion 1106 can have a length 1116 that is less than or equal to a corresponding length of light pipe 1104 (e.g., length 1014 of light pipe 1002). Illuminated portion 1106 can have a height that is greater than or equal to eight tenths of a millimeter.

Figure 12:
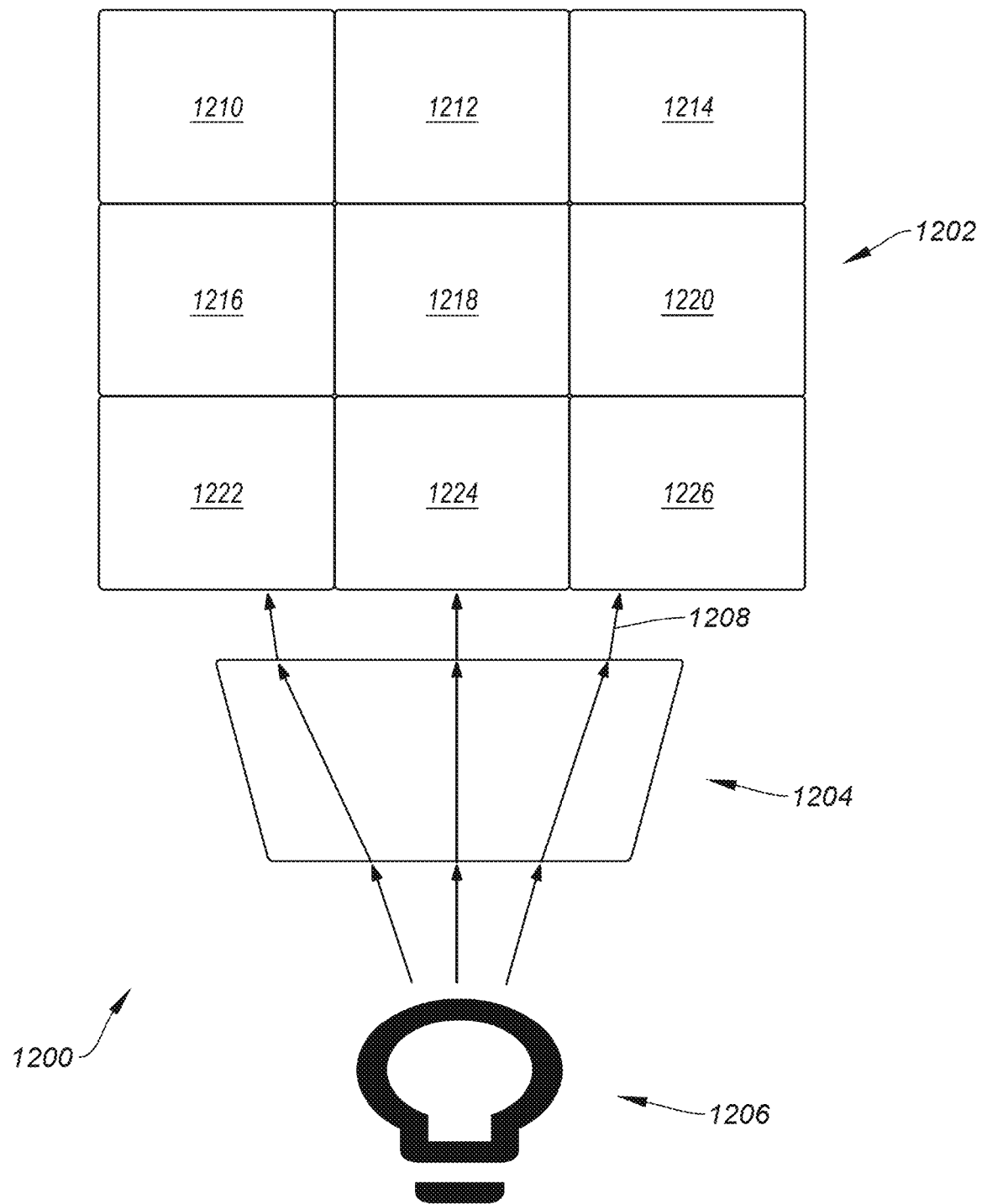
FIG. 12 illustrates features of the disclosure pertaining to illumination uniformity that can be used in the mechanism of FIG. 10.

FIG. 12 illustrates additional features of an illuminated portion 302 of a keycap (such as illuminated portion 1106 and/or illuminated portion 1008). Illustrated is system 1200 including a light source 1206 (which can be similar to light source 1108 and/or light source 1004), light pipe 1204 (which can be similar to light pipe 1104 and/or light pipe 1002). As illustrated, light can be emitted from light source 1206 and pass through and be directed to illuminated portion 1202 by light pipe 1204. Several notional paths of light are illustrated as arrows, such as arrow 308.

Areas 1210-1226 are respective areas of illuminated portion 1202. Depending on parameters of light pipe 1204, light that is channeled from light source 1206 to illuminated portion 1202 may form several different patterns (e.g., certain ones of areas 1210-1226 may appear brighter than other areas of 1210-1226). The light pipes disclosed herein can provide a relatively uniform distribution of light across areas 1210-1226. One way to measure average luminance across illuminated portion 1202 is to find one of the areas of 1210-1226 that has the lowest average illumination provided by light pipe 1204 and divide this by one of the areas of 1210-1226 having the highest average illumination. The disclosed light pipes (such as light pipe 1204, 1104, and 1002) have been found to provide optimal average luminance across illuminated portion 1202, thus providing a desirable illumination uniformity across illuminated portion 1202.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions, and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying," or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A keyboard key structure comprising:
a substrate;
a key switch having a top, a bottom, and a side, wherein the bottom of the key switch is configured to be coupled to the substrate;
a key cap including a transparent region, the key cap configured to be coupled to the top of the key switch; and
a light guide coupled to the side of the key switch, the light guide comprising:
a planar bottom surface; and
a planar top surface that is wider than and parallel to the bottom surface;
a light emitting element coupled to the substrate and configured under the bottom surface of the light guide such that the light emitting element, the light guide, and the transparent region of the key cap are in a collinear arrangement,
wherein the light emitting element is operable to emit light into the bottom surface of the light guide,
wherein the light guide directs the light entering the bottom surface through a body of the light guide, out of the top surface of the light guide, and through the transparent region of the key cap, and
wherein a distance (K) of an air gap between the light emitting element and the light guide is 0<K<0.3 mm inclusive.

2. The keyboard key structure of claim 1 wherein a width of the bottom surface of the light guide is wider than a width of the light emitting element.

3. The keyboard key structure of claim 1 wherein the light guide has a trapezoidal shape and a uniform thickness.

4. The keyboard key structure of claim 1 wherein the top surface of the light guide is at a distance D from the transparent region of the keycap when the key switch is in a non-depressed state, and
wherein dimensions of the light guide cause the light exiting the light guide at the top surface to undergo light spread at an angle that causes the light to fill the transparent region of the keycap when the transparent region is at the distance D from the light guide.

5. The keyboard key structure of claim 4 wherein the distance D is greater than or equal to 4 mm.

6. The keyboard key structure of claim 1 wherein a thickness of the light guide is from 1 mm to 3.5 mm inclusive.

7. The keyboard key structure of claim 1 wherein a width of the transparent region is equal to or less than a width of the top surface of the light guide.

8. The keyboard key structure of claim 1 wherein a width of the top surface of the light guide is at least twice a width of the bottom surface of the light guide.

9. The keyboard key structure of claim 1 wherein a height of the transparent region is greater than or equal to 0.8 mm.

10. The keyboard key structure of claim 1 wherein a thickness of the transparent region is less than or equal to the thickness of the light guide plus 2 mm.

11. A light guide for a keyboard key structure, the light guide comprising:
a planar bottom surface; and
a planar top surface that is two times as wide and parallel to the bottom surface,
wherein the light guide in operation is configured to be placed between a light emitting element and a transparent region of a key cap in a collinear arrangement,
wherein the light guide receives light on its bottom surface from the light emitting element,
wherein the light guide directs the light entering the bottom surface through a body of the light guide, out of the top surface of the light guide, and out toward the transparent region of the key cap, and
wherein the bottom surface of the light guide is configured to be placed at a distance (K) from the light emitting element, such that 0<K<0.3 mm inclusive.

12. The light guide for the keyboard key structure of claim 11 wherein the light guide has a trapezoidal shape and a uniform thickness.

13. The light guide for the keyboard key structure of claim 12 wherein the light guide has a height of greater than or equal to 5 mm, and wherein the light guide has a depth T such that 1 mm≤T≤3.5 mm.

14. The light guide for the keyboard key structure of claim 11 wherein a width of the bottom surface of the light guide is wider than a width of the light emitting element.

15. The light guide for the keyboard key structure of claim 11 wherein the top surface of the light guide is at a distance D from the transparent region of the key cap when the key switch is in a non-depressed state, and
wherein dimensions of the light guide cause the light exiting the light guide at the top surface to undergo light spread at an angle that causes the light to fill the transparent region of the key cap when the transparent region is at the distance D from the light guide.

16. The light guide for the keyboard key structure of claim 15 wherein the distance D is greater than or equal to 4 mm.

17. The light guide for the keyboard key structure of claim 11 wherein a width of the transparent region is equal to or less than a width of the top surface of the light guide.

18. The light guide for the keyboard key structure of claim 11 wherein a thickness of the transparent region is less than or equal to the thickness of the light guide plus 2 mm.

19. A computer key mechanism comprising:
a keycap including an illuminated portion that is at least partially transparent;
a light emitter;
a light pipe coupled to the keycap and the light emitter, wherein the light pipe is shaped as a trapezoidal prism having a distal end located adjacent to the keycap and a proximal end located adjacent to the light emitter; and
wherein the light pipe has a uniform thickness.

20. The computer key mechanism of claim 19, wherein a length of the distal end is substantially twice a corresponding length of the proximal end.

21. The computer key mechanism of claim 19 wherein a distance between the distal end and the proximal end is greater than or equal to five millimeters.

22. The computer key mechanism of claim 19 wherein a distance between the distal end of the light pipe and the keycap is greater than or equal to four millimeters.

23. The computer key mechanism of claim 19 wherein the trapezoidal prism is an isosceles trapezoidal prism.

24. The computer key mechanism of claim 19 wherein the light pipe has a thickness of greater than or equal to one millimeter and less than or equal to three and a half millimeters.

25. The computer key mechanism of claim 19 wherein the light pipe has a refractive index of between one and three tenths and one and seven tenths.

26. The computer key mechanism of claim 19 wherein the illuminated portion has a thickness corresponding to the thickness of the light pipe and wherein the thickness of the illuminated portion is less than two millimeters more than the thickness of the light pipe.

27. The computer key mechanism of claim 19 wherein the illuminated portion has a height corresponding to the height of the light pipe and wherein the height of the illuminated portion is greater than or equal to eight tenths of a millimeter.

28. The computer key mechanism of claim 19 wherein a width of an air gap between the light emitter and the light pipe is between zero and three tenths of a millimeter inclusively.

\* \* \* \* \*